(12) United States Patent
Maeda et al.

(10) Patent No.: US 7,610,600 B2
(45) Date of Patent: Oct. 27, 2009

(54) TELEVISION RECEPTION SYSTEM, CHANNEL SELECTION APPARATUS AND DISPLAY APPARATUS

(75) Inventors: Satoru Maeda, Kanagawa (JP); Munehiro Yoshikawa, Kanagawa (JP); Noriyuki Uchiumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 425 days.

(21) Appl. No.: 11/516,830

(22) Filed: Sep. 7, 2006

(65) Prior Publication Data

US 2007/0002186 A1 Jan. 4, 2007

Related U.S. Application Data

(63) Continuation of application No. 09/880,301, filed on Jun. 13, 2001, now Pat. No. 7,484,235.

(30) Foreign Application Priority Data

Jun. 14, 2000 (JP) ............................. 2000-177896

(51) Int. Cl.
*G06F 13/00* (2006.01)
*G06F 3/00* (2006.01)
*H04N 5/445* (2006.01)
*H04N 7/173* (2006.01)

(52) U.S. Cl. .............................. 725/38; 725/80; 725/81

(58) Field of Classification Search ................. 725/38, 725/80, 81
See application file for complete search history.

(56) References Cited

U.S. PATENT DOCUMENTS 5,585,865 A * 12/1996 Amano et al. ................. 725/14
5,708,961 A    1/1998 Hylton et al.
5,790,201 A    8/1998 Antos
5,982,363 A   11/1999 Naiff
6,008,777 A   12/1999 Yiu
6,072,994 A    6/2000 Phillips et al.
6,097,441 A    8/2000 Allport
6,263,503 B1   7/2001 Margulis
6,466,233 B1  10/2002 Mitani
6,567,984 B1 *  5/2003 Allport ........................ 725/110

FOREIGN PATENT DOCUMENTS

| CN | 2105155 U | 5/1992 |
| WO | WO 00 03012 | 1/1998 |
| WO | WO 98 16065 | 4/1998 |
| WO | WO 98 50848 | 11/1998 |
| WO | WO 00 16544 | 3/2000 |
| WO | WO 00 31982 | 6/2000 |

* cited by examiner

*Primary Examiner*—Hunter B. Lonsberry
(74) *Attorney, Agent, or Firm*—Frommer Lawrence & Haug LLP; William S. Frommer; Paul A. Levy

(57) ABSTRACT

A television reception system is disclosed by which a television broadcasting program can be enjoyed at any place in a home without being influenced by connection to an antenna cable or a communication circuit and which can be connected to a network such as the Internet. A channel selection apparatus and a display apparatus are formed as separate apparatus from each other. The channel selection apparatus receives broadcasting signals, selects one of the broadcasting signals, forms a transmission signal from the selected broadcasting signal and transmits the transmission signal by radio. The radio signal from the channel selection apparatus is received by the display apparatus, and an image based on an image signal of the received signal is displayed on an LCD apparatus serving as a display element.

6 Claims, 19 Drawing Sheets

FIG. 18

TELEVISION RECEPTION SYSTEM, CHANNEL SELECTION APPARATUS AND DISPLAY APPARATUS

This is a continuation of application Ser. No. 09/880,301, filed Jun. 13, 2001, now U.S. Pat. No. 7,484,235, which is entitled to the priority filing date of Japanese application 2000-177896, filed in Japan on Jun. 14, 2000, the entirety of which is incorporated herein by reference.

BACKGROUND OF THE INVENTION

This invention relates to a television reception system, a channel selection apparatus and a display apparatus which can receive and utilize a broadcasting signal of, for example, a television broadcast and can transmit and receive information through a communication circuit.

The number of those who use and connect a personal computer having a communication function to the Internet through a communication circuit such as a telephone circuit and utilize various kinds of information and services provided through the Internet are increasing. Meanwhile, in order to allow those users who are not familiar with a personal computer or the like to easily utilize information or services provided through the Internet without using a personal computer whose operation is complicated, a television receiver which has a connection function to the Internet has been proposed.

A television receiver having the connection function to the Internet not only can receive and select a broadcasting signal of an object television broadcasting program to allow its user to enjoy the television broadcasting program but also has a communication function. Consequently, the television receiver can be connected to the Internet through a communication circuit such as a telephone circuit to receive provision of image information and/or text information and display the received information on a display screen. Further, the television receiver can be used to prepare, transmit or receive an electronic mail comparatively simply.

However, in order to connect a television receiver having a connection function to the Internet described above to the Internet, a telephone line led in from a telephone network and laid indoors must be connected to the television receiver. A connection terminal (modular jack) for a telephone line laid indoors is provided fixedly at a predetermined position of a wall of a house or the like. Therefore, the location of the television receiver having a connection function to the Internet is limited to some degree in accordance with the position of the connection terminal to the telephone line laid indoors.

Also when the television receiver having a connection function to the Internet is used as an ordinary television receiver, an antenna cable led in from an antenna provided outdoors must be connected to the television receiver. However, also a connection terminal to the antenna cable is provided fixedly at a predetermined position on a wall or the like indoors similarly to the connection terminal to the telephone line. Therefore, if also the position of the connection terminal to the antenna cable laid indoors is taken into consideration, the location of the television receiver is almost limited to a certain position, and the television receiver cannot sometimes be located at a position favorable to the user.

Therefore, in order to make it possible for the user to locate a television receiver having a connection function to the Internet at a favorable position, it is necessary to perform such work as to use a cable extension, to change the location of the connection terminal to the telephone line or the location of the connection terminal to the antenna cable or to additionally provide a connection terminal to the telephone line or a connection terminal to the antenna cable.

However, where a cable extension is used, since it is laid indoors, it makes an obstacle. On the other hand, if work is performed to additionally provide or change the location of a connection terminal to the telephone line or a connection terminal to the antenna cable, much time and a high cost are required to locate the television receiver at a favorable position to its user.

Thus, also it is a possible idea to use a small antenna for the indoor use without connecting the television receiver to the antenna cable laid indoors. However, where a small antenna for the indoor use is used, it is likely to be influenced by a building in the neighborhood or a person such as the user therearound (influenced by the body of a human being as a screening object for radio waves) when compared with a comparatively great antenna installed outdoors such as on the roof.

Therefore, even if a small antenna for the indoor use is used, it is impossible to obtain a good image with certainty since the small antenna cannot receive a television broadcasting wave well, a displayed image is disturbed by interference of a radio wave, or increased noise appears on the displayed image.

SUMMARY OF THE INVENTION

It is an object of the present invention to provide a television reception system, a channel selection apparatus and a display apparatus by which enjoyment of a television broadcasting program is allowed at any place in a home without being influenced by connection to an antenna cable or to a communication circuit and connection to a network such as the Internet is allowed.

In order to attain the object described above, according to an aspect of the present invention, there is provided a television reception system, comprising a channel selection apparatus for receiving broadcasting signals, selecting a broadcasting program from within the broadcasting signals in accordance with an instruction of a user and transmitting a signal of the selected broadcasting program by radio, the channel selection apparatus being connected to a communication circuit, and a display apparatus for receiving the radio signal from the channel selection apparatus and displaying an image based on an image signal of the received signal on a display element thereof.

In the television reception system, the channel selection apparatus and the display apparatus are formed as separate apparatus from each other. The channel selection apparatus receives broadcasting signals, selects one of the broadcasting signals, and transmits a signal of a broadcasting program selected by its user by radio. The radio signal from the channel selection apparatus is received by the display apparatus, and an image based on an image signal of the received signal is displayed on the display element of the display apparatus.

Consequently, the channel selection apparatus can be located at the most suitable position taking locations at which a connection terminal to an antenna cable and another connection terminal to the communication circuit led in from the outside to the inside of a house are provided into consideration. The user can use the display apparatus to enjoy a broadcasting program at any place within a range within which the display apparatus can receive a radio signal from the channel selection apparatus.

Preferably, the channel selection apparatus includes reception means for receiving a signal transmitted thereto through the communication circuit, and means for transmitting the signal received by the reception means by radio, and the display apparatus receives the radio signal from the channel selection apparatus, forms a displaying signal from the received signal and displays an image based on the displaying signal on the display element.

With the television reception system, information provided to the channel selection apparatus through the communication circuit is transmitted by radio from the channel selection apparatus. The radio signal from the channel selection apparatus is received by the display apparatus, and a displaying signal is formed from the received signal by the display apparatus. Then, an image based on the displaying signal is displayed on the display element of the display apparatus.

Consequently, the user of the channel selection apparatus can use the display apparatus to display and observe information provided through the communication circuit at any place within a range within which the display apparatus can receive a radio signal from the channel selection apparatus.

Where the channel selection apparatus transmits a signal of compressed data by radio, the display apparatus may include decompression means for decompressing the data of the received signal from the channel selection apparatus.

With the television reception system, the signal transmitted by radio from the channel selection apparatus is a signal of compressed data. The display apparatus can receive the signal transmitted by radio from the channel selection apparatus and decompress and utilize the data of the received signal.

Consequently, since the signal transmitted from the channel selection apparatus is a signal of compressed data, the frequency band of an electronic wave used for the radio transmission of the signal can be utilized efficiently. Further, much information can be transmitted by radio to the display apparatus efficiently and with certainty. Accordingly, a signal having a great amount of data such as a television broadcasting program or image information provided through the communication circuit can be transmitted to the display apparatus and provided to the user with certainty.

Preferably, the display apparatus includes instruction input acceptance means for accepting an operation instruction input of the user, and instruction information transmission means for transmitting by radio at least instruction information to be transmitted to the channel selection apparatus from within instruction information of the operation instruction input accepted by the instruction input acceptance means, and the channel selection apparatus includes control means for receiving the instruction information transmitted by radio from the display apparatus and controlling, when the received instruction information is for the channel selection apparatus itself, so as to perform processing based on the instruction information.

With the television reception system, the display apparatus includes the instruction input acceptance means and accepts an instruction input of the user such as, for example, a changing instruction of a broadcasting channel through the instruction input acceptance means. Instruction information corresponding to the instruction input accepted in this manner is supplied from the display apparatus to the channel selection apparatus by radio.

Consequently, the channel selection apparatus receives the instruction information from the display apparatus and performs, if the instruction information is for the channel selection apparatus, control in accordance with the received instruction information. In other words, the user can perform such operation as remote control (remote operation) to change a broadcasting signal or a program to be selected through the display apparatus.

Accordingly, the user of the display apparatus can change a broadcasting program to be provided at any time to enjoy an object broadcasting program or to obtain object information within a range within which the display apparatus can communicate with the channel selection apparatus.

Preferably, the display apparatus includes transmission instruction input acceptance means for accepting a transmission instruction input from the user, and transmission information transmitting means for transmitting information corresponding to information indicated by the transmission instruction input accepted by the transmission instruction input acceptance means as transmission information by radio, and the channel selection apparatus includes transmission information reception means for receiving the transmission information transmitted thereto by radio from the display apparatus, and transmission information signaling means for signaling the transmission information received by the transmission information reception means through the communication circuit.

With the television reception system, information corresponding to information indicated by a transmission instruction input accepted by the transmission instruction input acceptance means of the display apparatus is transmitted by the transmission information transmitting means. The channel selection apparatus receives the transmission information from the display apparatus and signals the transmission information through the communication circuit by the transmission information signaling means.

Consequently, within a range within which the display apparatus can communicate with the channel selection apparatus, it is possible to transmit a prepared electronic mail immediately or transmit an electronic mail prepared in advance and stored in a memory through the display apparatus.

Preferably, the channel selection apparatus can select a plurality of broadcasting signals simultaneously and transmit signals of a plurality of broadcasting programs selected by a user in a separable state from each other by radio, and the display apparatus receives the signals transmitted by radio from the channel selection apparatus and displays an image based on an image signal of one of the signals on the display element.

With the television reception system, the channel selection apparatus can select a plurality of broadcasting signals simultaneously. Then, signals of a plurality of broadcasting programs selected from within the broadcasting signals by the user are transmitted by radio so that the signals can be separated from each other by the destination of the transmission.

The display apparatus can receive the plurality of signals transmitted by radio from the channel selection apparatus and display an image based on an image signal of one of the received signals on the display element.

Consequently, one channel selection apparatus can be utilized by a plurality of display apparatus. Accordingly, it is possible for each member of a family to have a display apparatus for the member and thus enjoy a program favorable to the member at any place within a range within which the display apparatus can receive a radio signal from the channel selection apparatus. Therefore, it is not necessary to purchase a plurality of television receivers or to additionally provide a connection terminal to an antenna cable or a connection terminal to a telephone line as in the related art.

In summary, with the television reception system according to the present invention, the necessity to lay a surplus antenna cable or telephone line indoors can be eliminated. Further, the user can enjoy a television program, a browser or an electronic mail with a good picture quality on the display apparatus at any place within a range within which the display apparatus can communicate by radio with the channel selection apparatus such as in a house or in a garden.

Further, not such a conventional form that the user sits in front of and watches a television receiver placed at a certain place, but another form that the user carries a display apparatus to any favorable place and watches it at the place can be realized.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 18 is a diagrammatic view illustrating a multiplexed transmission signal formed by and transmitted by radio from the channel selection apparatus shown in FIG. 17, according to the second embodiment of the present invention.

DETAILED DESCRIPTION OF THE PREFERRED EMBODIMENTS

First Embodiment

Figure 1:
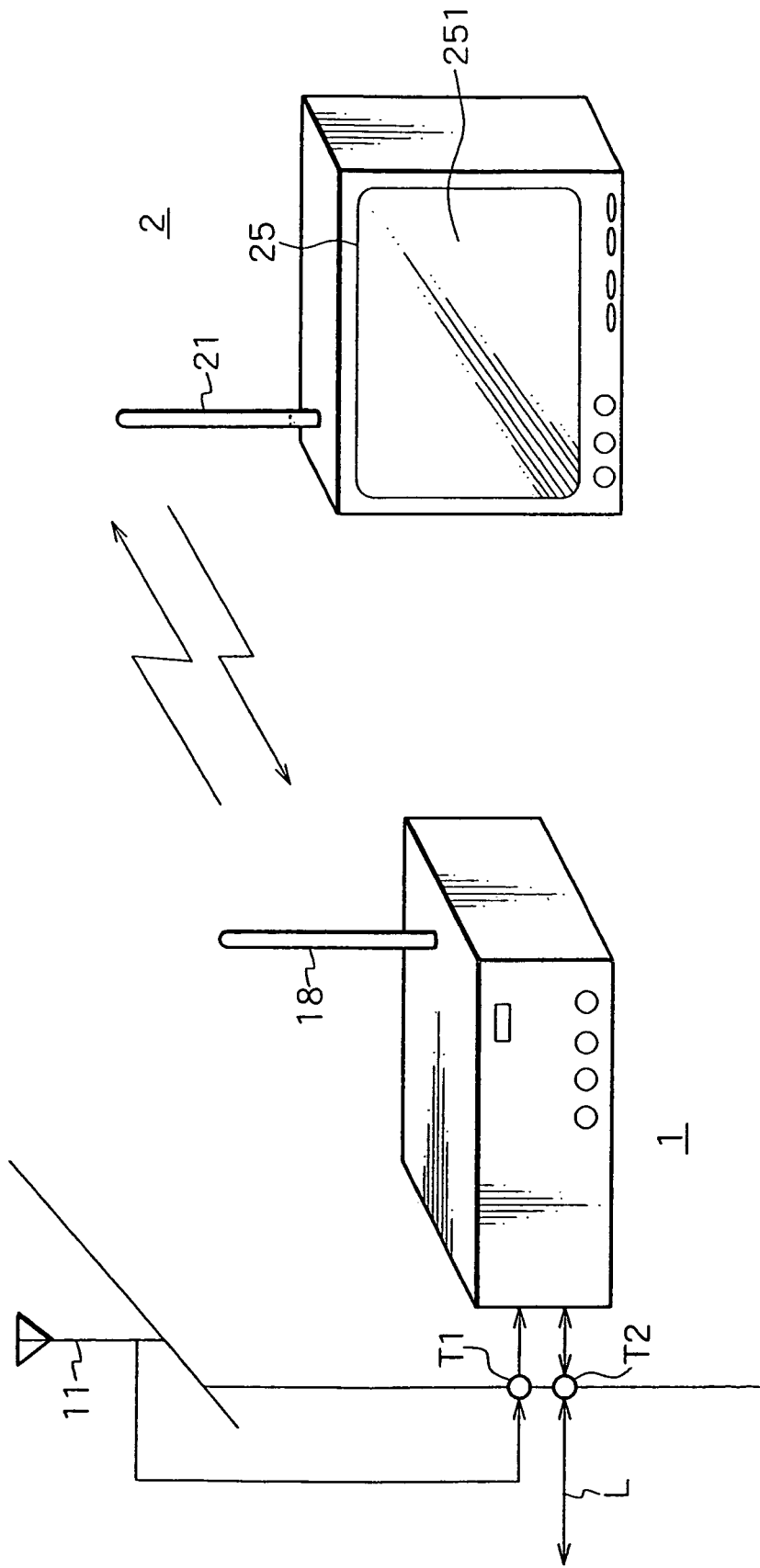
FIG. 1 is a schematic view showing a television reception system according to a first embodiment of the present invention.

Referring first to FIG. 1, there is shown a television reception system to which the present invention is applied. The television reception system shown includes a channel selection apparatus 1 and a display apparatus 2 connected to each other by radio communication. The channel selection apparatus 1 is formed in accordance with the present invention and located and used, for example, in a room of a home. The display apparatus 2 is formed in accordance with the present invention and used in the proximity of its user.

An antenna cable 11cb and a telephone line L are connected to the channel selection apparatus 1. The antenna cable 11cb is connected to a reception antenna 11 located outdoors for receiving a television broadcasting signal and is led in from the outside to the inside of a house. The telephone line L is connected to a telephone network not shown and is led in from the outside to the inside of the house.

The channel selection apparatus 1 receives television broadcasting signals from the reception antenna 11, selects and demodulates a television broadcasting signal and transmits the demodulated television broadcasting signal by radio toward the display apparatus 2 through a transmission/reception antenna 18. Further, the channel selection apparatus 1 receives and demodulates a signal transmitted thereto through the telephone line L and transmits the demodulated signal by radio toward the display apparatus 2 through the transmission/reception antenna 18.

Furthermore, the channel selection apparatus 1 can receive instruction information or transmission information such as an electronic mail from the display apparatus 2 through the transmission/reception antenna 18 and change the television broadcasting signal to be selected in accordance with the received instruction signal or transmit the transmission information through the telephone line L.

The display apparatus 2 receives a signal of a television broadcasting program through a transmission/reception antenna 21 transmitted by radio from the channel selection apparatus 1, and displays an image based on an image signal included in the received signal on a display screen of a liquid crystal display (LCD) apparatus 25 and emits sound based on a sound signal included in the received signal from a speaker (not shown) to allow the user of the display apparatus 2 to enjoy the television broadcasting program.

Further, the display apparatus 2 can receive a signal of, for example, an electronic mail or a homepage of the Internet received through the telephone line L by and transmitted by radio from the channel selection apparatus 1, form a display signal from the received signal and display an image based on the display signal on the LCD apparatus 25 to provide the image to the user.

A touch panel 251 is adhered to the display screen of the LCD apparatus 25 of the display apparatus 2 such that the display apparatus 2 can accept an input of information such as various instruction inputs from the user through display information displayed on the display screen of the LCD apparatus 25 and the touch panel 251. Thus, use of the touch panel 251 allows various operations such as to prepare and transmit an electronic mail or to receive and display an electronic mail destined for the display apparatus 2.

In this manner, the channel selection apparatus 1 has a function as an interface which fetches a television broadcasting signal and various kinds of information provided through the telephone line L into the television reception system and signals information from the television reception system to the communication network through the telephone line L. Meanwhile, the display apparatus 2 has a function as a user interface which provides information fetched into the television reception system by the channel selection apparatus 1 to the user and accepts information from the user.

Further, the channel selection apparatus 1 is located and used at a position at which it can be connected with certainty to both of a connection terminal T1 to the antenna cable 11cb and a connection terminal T2 to the telephone line L in accordance with the positions of the connection terminals T1 and T2 as seen in FIG. 1. Since the channel selection apparatus 1 and the display apparatus 2 are connected by radio, the display apparatus 2 can be located at any position within an area within which it can receive a radio signal from the channel selection apparatus 1 as seen in FIG. 1. Consequently, the user can use the display apparatus 2 to enjoy an object television broadcasting program or to establish a connection to the Internet to communicate an electronic mail or the like.

[Channel Selection Apparatus 1]

Figure 2:
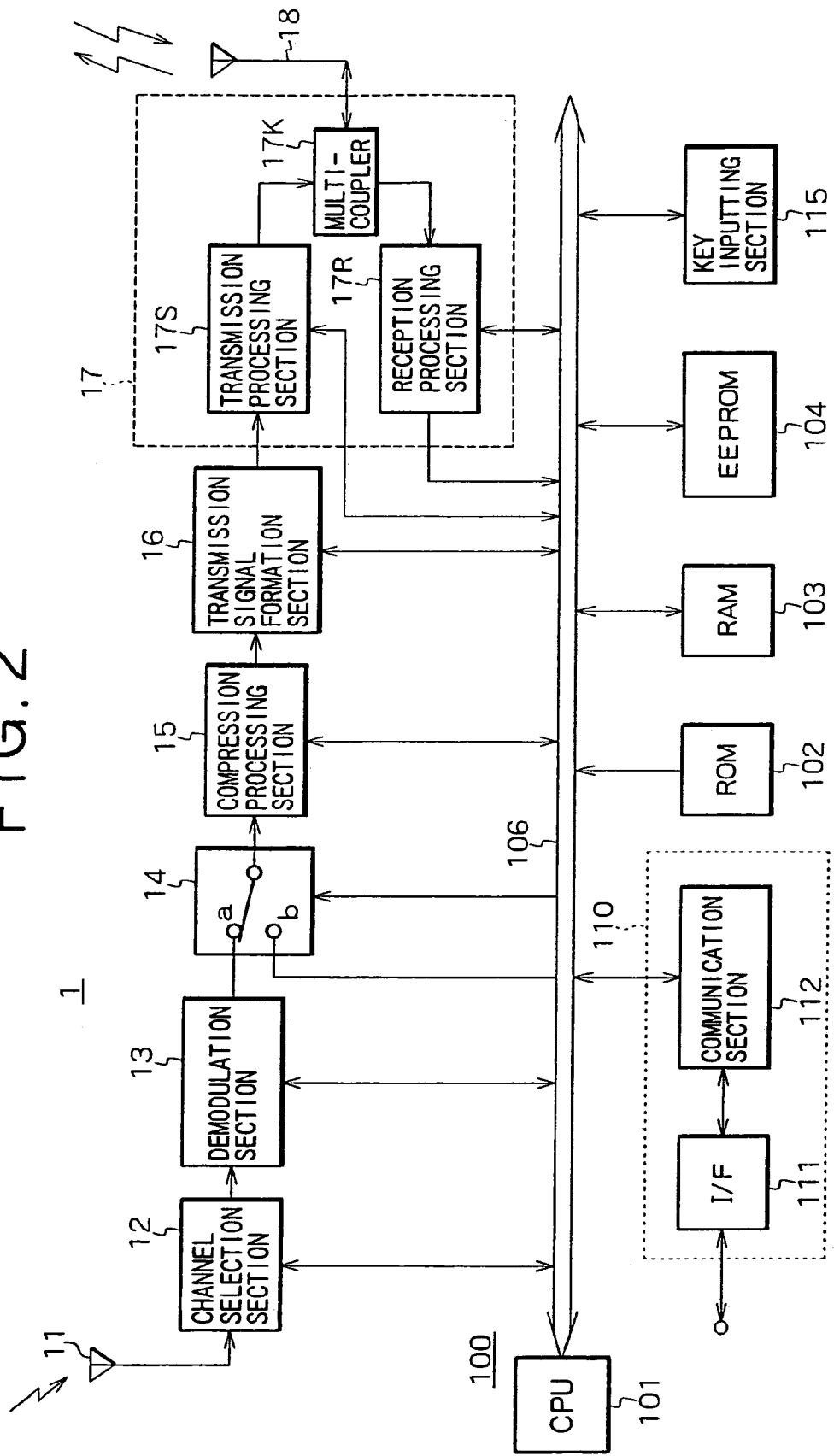
FIG. 2 is a block diagram showing a channel selection apparatus according to the first embodiment of the present invention.

Now, the channel selection apparatus 1 shown in FIG. 1 is described in detail. FIG. 2 shows the channel selection apparatus 1 to which the present invention is applied. The channel selection apparatus 1 includes a control section 100 which controls components of the channel selection apparatus 1.

The control section 100 is formed as a microcomputer which includes a central processing unit (CPU) 101, a read only memory (ROM) 102, a random access memory (RAM) 103, and an electrically erasable programmable read only memory (EEPROM) 104 all connected to each other by a CPU bus 106.

The ROM 102 has stored therein various programs to be executed by the channel selection apparatus 1 and data necessary for processing of the channel selection apparatus 1. The RAM 103 is used as a working area principally for various processes such as for temporarily storing data obtained by various processes.

The EEPROM 104 is a nonvolatile memory and keeps its stored information even if the power supply thereto is turned off. Thus, the EEPROM 104 realizes a last channel memory function of storing and keeping, for example, information of a broadcasting channel selected immediately before the main power supply to the channel selection apparatus 1 is disconnected so that, after the power supply is made available subsequently, a broadcasting signal of the channel selected immediately before the main power supply is disconnected is selected.

The channel selection apparatus 1 includes a channel selection section 12 to which the antenna cable 11cb from the reception antenna 11 located outside for receiving a television broadcasting signal is connected so that television broadcasting signals received by the reception antenna 11 are supplied to the channel selection section 12.

The channel selection section 12 selects one of the television broadcasting signals from the reception antenna 11 which corresponds to a channel selection instruction signal from the control section 100 and supplies the selected television broadcasting signal to a demodulation section 13. The demodulation section 13 demodulates the television broadcasting signal supplied thereto and supplies the demodulated signal (signal of a television program) to an input terminal a of a switch circuit 14.

The switch circuit 14 is switchably controlled with a changeover control signal from the control section 100 to selectively output the signal of a television program supplied to the input terminal a thereof from the demodulation section 13 or a signal supplied to another input terminal b from the control section 100. It is to be noted that the signal from the control section 100 to the switch circuit 14 described below is a signal of an electronic mail or information of a homepage of the Internet supplied to the channel selection apparatus 1 through the telephone line L and received through a modem section 110.

The signal outputted from the switch circuit 14 is supplied to a compression processing section 15. The compression processing section 15 compresses data of the signal supplied thereto using a predetermined compression method. The compression processing section 15 uses a data compression method such as, for example, the MPEG (Motion Picture Expert Group) method or the Wavelet method to compress data of the signal from the switch circuit 14.

The signal of the data compressed by the compression processing section 15 is supplied to a transmission signal formation section 16. The transmission signal formation section 16 forms a transmission signal which complies with a predetermined communication protocol. In the present embodiment, the transmission signal formation section 16 forms a transmission signal which complies with a protocol of the IEEE (Institute Electrical and Electronics Engineers) 802.11 system or a developed protocol of the same.

The transmission signal formed by the transmission signal formation section 16 is supplied to a transmission processing section 17S of a radio section 17. The transmission processing section 17S performs modulation processing and amplification processing of the transmission signal in accordance with a control signal from the control section 100. The transmission signal processed by the transmission processing section 17S is transmitted by radio through a multicoupler 17K and the transmission/reception antenna 18.

The multicoupler 17K prevents otherwise possible interference between a transmission signal and a reception signal. As described hereinabove, the channel selection apparatus 1 is designed to receive instruction information or the like transmitted by radio from the display apparatus 2 by means of the transmission/reception antenna 18. Thus, the multicoupler 17K prevents the transmission signal from the transmission processing section 17S from interfering with the reception signal received through the transmission/reception antenna 18.

A signal, for example, for channel selection instruction from the display apparatus 2 received through the transmission/reception antenna 18 is supplied to a reception processing section 17R through the multicoupler 17K. The reception processing section 17R performs processing such as demodulation of the signal supplied thereto to convert the signal into a signal which can be handled by the control section 100 and supplies the signal to the control section 100.

When the signal from the reception processing section 17R is an instruction signal for channel selection instruction or the like, the control section 100 controls the pertaining components in accordance with the instruction signal. Accordingly, when the signal supplied from the reception processing section 17R to the control section 100 is a channel selection instruction, the control section 100 supplies a channel selection instruction signal corresponding to the channel selection instruction supplied thereto to the channel selection section 12 so that the television broadcasting signal to be selected can be changed over.

On the other hand, when the signal supplied from the reception processing section 17R to the control section 100 is transmission information such as an electronic mail, the control section 100 establishes a connection to the telephone circuit through the modem section 110 and the telephone line L and signals the transmission information to the thus connected telephone circuit so as to be transmitted to an object destination, as hereinafter described.

As shown in FIG. 2, the modem section 110 includes an interface (referred to as I/F in FIG. 2) section 111 and a communication section 112. The I/F section 111 is an interface between the channel selection apparatus 1 and a communication circuit connected between the other party of communication and the channel selection apparatus 1 through a telephone network, and receives a signal transmitted thereto through the telephone circuit (telephone line L) or transmits a signal from the channel selection apparatus 1.

The communication section 112 demodulates a signal received through the I/F section 111 and supplies the demodulated signal to the control section 100, or modulates a transmission signal from the control section 100 and supplies the modulated transmission signal to the I/F section 111. Thus, various data can be transmitted to and received from the other party of communication to which the telephone circuit is connected.

Accordingly, as hereinabove described, the channel selection apparatus 1 can be connected to the Internet through the modem section 110, the telephone line L and a predetermined ISP (Internet Service Provider) to receive provision of various kinds of information or receive or transmit an electronic mail through the Internet.

To this end, the control section 100 can control the modem section 110 to establish an off-hook state or an on-hook state. The control section 100 further has a function as a dialer of signaling, when it controls the modem section 110 to establish an off-hook state, a dial signal to the telephone circuit.

It is to be noted that, as shown in FIG. 2, a key inputting section 115 having a power supply on/off key and various setting keys provided thereon is connected to the control section 100 so that switching on/off of the main power supply to the channel selection apparatus 1 and various setting inputting can be performed through the key inputting section 115.

In this manner, the channel selection apparatus 1 can receive, select and demodulate a television broadcasting signal, compress data of the demodulated signal of a television broadcasting program and transmit the compressed signal by radio in accordance with a predetermined communication protocol. Further, the channel selection apparatus 1 can receive and demodulate information provided through a telephone circuit, compress data of the information and transmit the compressed information data by radio in accordance with a predetermined protocol in a similar manner as with a television broadcasting signal.

Furthermore, the channel selection apparatus 1 can receive instruction information such as a channel selection instruction transmitted thereto by radio from the display apparatus 2 described below and perform processing in response to the information or transmit transmission information of an electronic mail or the like transmitted thereto from the display apparatus 2 through the modem section 110.

[Display Apparatus 2]

Now, the display apparatus 2 connected by radio to the channel selection apparatus 1 described above is described with reference to FIG. 3. The display apparatus 2 shown is controlled by a control section 200 in the form of a microcomputer. The control section 200 includes a CPU 201, a ROM 202, a RAM 203 and an EEPROM 204 all connected to each other by a CPU bus 205.

The ROM 202 stores various processing programs to be executed by the display apparatus 2 and data necessary for such processing. The RAM 203 is used principally as a working area for various processes for temporarily storing data obtained in various processes.

The EEPROM 204 is a nonvolatile memory and maintains its stored information even if the power supply is disconnected. Thus, the EEPROM 204 can store for example various setting parameters, an electronic mail prepared or a received electronic mail.

First, operation of the display apparatus 2 when it receives a radio signal from the channel selection apparatus 1 is described. A radio signal from the channel selection apparatus 1 which conforms with the predetermined protocol is received by the transmission/reception antenna 21 and supplied to a reception processing section 22R through a multi-coupler 22K. The reception processing section 22R performs processing such as demodulation for the signal supplied thereto and supplies the demodulated signal to a decompression processing section 23.

Since a signal transmitted by radio from the channel selection apparatus 1 is in a compressed form of data as described hereinabove, the decompression processing section 23 of the display apparatus 2 decompresses the demodulated signal from the channel selection apparatus 1 to restore an original signal. If the restored signal is a signal of a television broadcasting program, then since it is composed of an image signal and a sound signal, the image signal is supplied to an image signal processing section 24 while the sound signal is supplied to a sound signal processing section 26.

The image signal processing section 24 forms a displaying signal from the image signal from the decompression processing section 23 and supplies the displaying signal to the LCD apparatus 25. Consequently, an image corresponding to the image signal transmitted by radio from the channel selection apparatus 1 is displayed on the LCD apparatus 25. Meanwhile, the sound signal processing section 26 forms a sound signal to be supplied to a speaker 27 from the sound signal supplied thereto and supplies the sound signal to the speaker 27. Consequently, sound corresponding to the sound signal transmitted by radio from the channel selection apparatus 1 is emitted from the speaker 27.

In this manner, the display apparatus 2 can receive a signal of a television broadcasting program or the like transmitted by radio from the channel selection apparatus 1 and reproduce and output an image signal and/or a sound signal of the received signal so that they may be provided to the user.

Figure 4:
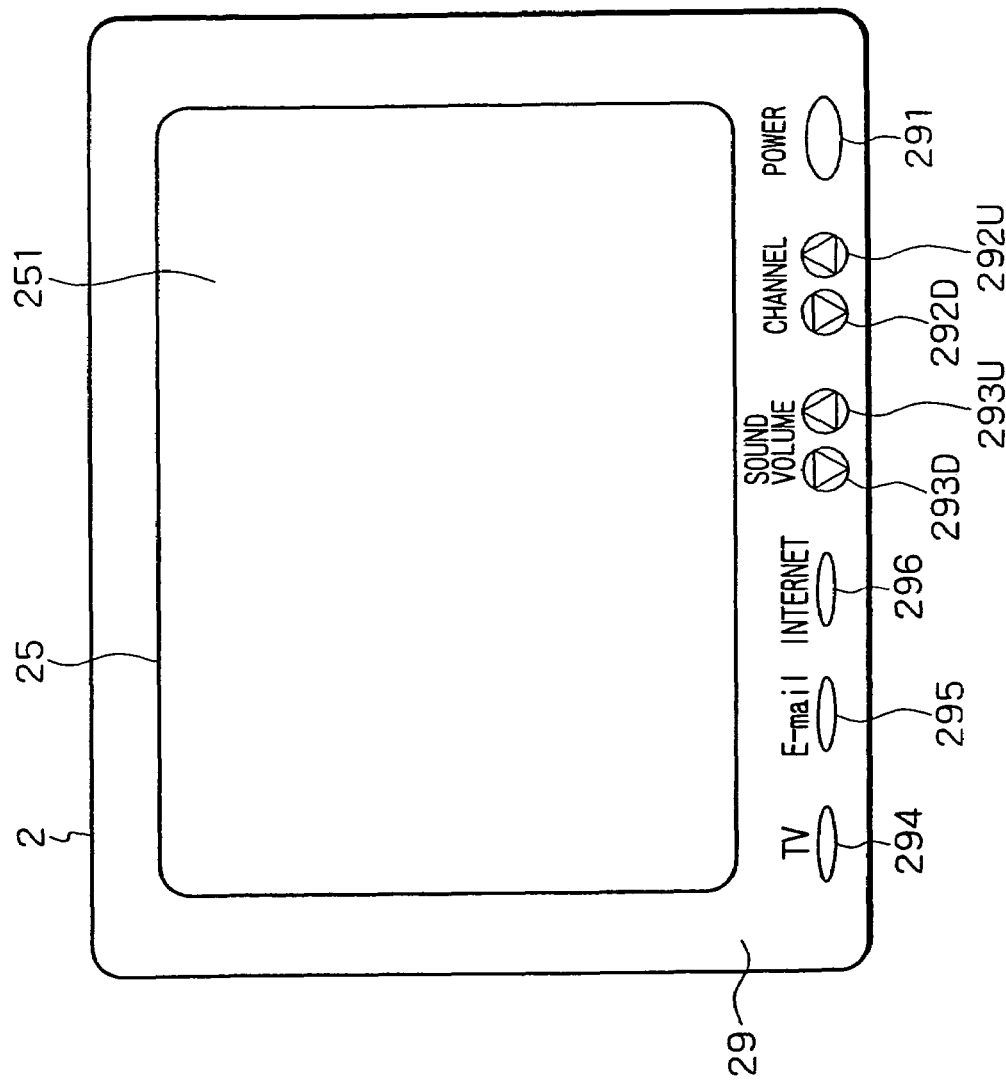
FIG. 4 is a schematic front elevational view of the display apparatus according to the first embodiment of the present invention.

Now, operation of the display apparatus 2 when a radio signal is to be transmitted to the channel selection apparatus 1 is described. FIG. 4 shows an appearance of the display apparatus 2 when the display apparatus 2 is viewed from the front side of the LCD apparatus 25 of the display apparatus 2.

As seen in FIG. 4, a key inputting section 29 having various operation keys thereon is provided at a portion of the display apparatus 2 below the display screen.

The key inputting section 29 provided below the LCD apparatus 25 of the display apparatus 2 includes a power supply on/off key 291, an up key 292U and a down key 292D for channel selection, and an up key 293U and a down key 293D for sound volume adjustment.

The key inputting section 29 of the display apparatus 2 further includes, as mode changeover keys, a changeover key (TV key) 294 to a television mode, a changeover key (E-mail key) 295 to an electronic mail mode, and a changeover key (Internet key) 296 to an Internet mode.

Further, as seen in FIG. 4, the touch panel 251 is adhered to the display screen of the LCD apparatus 25 of the display apparatus 2 such that it can be touched by a finger of the user, a touch pen or the like so that inputting of various kinds of information such as inputting of an instruction from the user can be accepted through display information displayed on the display screen of the LCD apparatus 25 and the touch panel 251.

Figure 3:
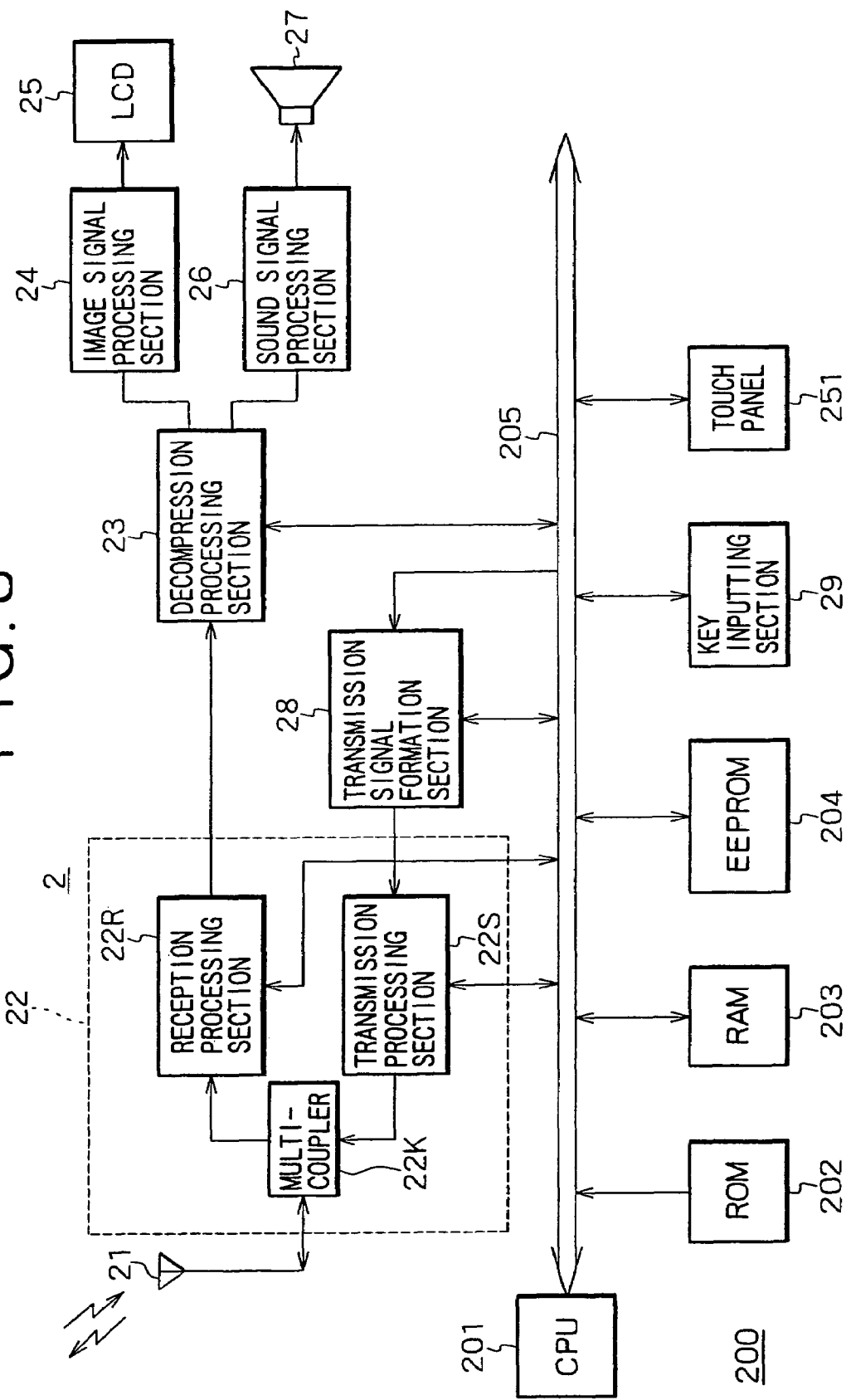
FIG. 3 is a block diagram showing a display apparatus according to the first embodiment of the present invention.

The key inputting section 29 and the touch panel 251 are connected to the control section 200 of the display apparatus 2 as seen in FIG. 3. Referring back to FIG. 3, when instruction information to the channel selection apparatus 1 is received through the key inputting section 29 and the touch panel 251, the control section 200 supplies the instruction information to a transmission signal formation section 28.

The transmission signal formation section 28 forms a transmission signal to be transmitted to the channel selection apparatus 1 from the instruction information from the control section 200 and supplies the transmission signal to a transmission processing section 22S. The transmission processing section 22S performs such processing as modulation and amplification for the transmission signal supplied thereto to form a transmission signal of the format for actual transmission and transmits the transmission signal to the channel selection apparatus 1 through the multicoupler 22K and a transmission/reception antenna 21.

Consequently, as described hereinabove, the channel selection apparatus 1 can perform processing in accordance with information transmitted thereto by radio from the display apparatus 2. For example, if the user operates the up key 292U or the down key 292D for the channel of the display apparatus 2, then the control section 200 of the display apparatus 2 controls the transmission signal formation section 28 to form a channel selection instruction signal (transmission signal) and transmits the channel selection instruction signal by radio through the transmission processing section 22S, multicoupler 22K and transmission/reception antenna 21.

In the channel selection apparatus 1, as described hereinabove, the channel selection instruction signal of the radio signal from the display apparatus 2 is received by the transmission/reception antenna 18 and supplied to the reception processing section 17R through the multicoupler 17K. Then, the channel selection instruction signal is demodulated by the reception processing section 17R and supplied to the control section 100.

The control section 100 of the channel selection apparatus 1 controls the channel selection section 12 in accordance with the channel selection instruction signal from the reception processing section 17R to change the television broadcasting signal to be selected in accordance with the instruction from the user of the display apparatus 2. In this manner, the user can remotely operate the channel selection apparatus 1 through the display apparatus 2 to receive provision of object information through the channel selection apparatus 1 or transmit an electronic mail as hereinafter described.

It is to be noted that the multicoupler 22K of a radio section 22 shown in FIG. 3 is used to prevent otherwise possible interference between a transmission signal and a reception signal similarly to the radio section 17 of the channel selection apparatus 1 described hereinabove.

[Preparation, Transmission and Reception of an Electronic Mail]

In the television reception system, not only it is possible to change over the selected channel by the channel selection apparatus 1 through radio communication through the display apparatus 2 as described above, but also it is possible to establish a connection, for example, to the Internet through the channel selection apparatus 1 to receive provision of various kinds of information or to transmit or receive an electronic mail.

In this instance, as described hereinabove, inputting means is formed from display information of the display screen of the LCD apparatus 25 of the display apparatus 2 and the touch panel 251 adhered to the LCD apparatus 25, and the user can produce and transmit an electronic mail simply and can download an electronic mail destined for the user from a server and display the electronic mail through the inputting means.

In the following, preparation, transmission and reception of an electronic mail performed by the television reception system are described. As described hereinabove with reference to FIG. 4, the display apparatus 2 includes the TV key 294, E-mail key 295 and Internet key 296 below the LCD apparatus 25.

In the display apparatus 2, when the power supply switch 291 is operated so that power supply to the display apparatus 2 is made available, the display apparatus 2 is first placed into the television mode. Then, if the E-mail key 295 is depressed, then the control section 200 of the display apparatus 2 reads out and executes a processing program for an electronic mail from the ROM so as to enable processing regarding an electronic mail to be performed. In other words, the control section 200 places the display apparatus 2 into the electronic mail mode.

Figure 5:
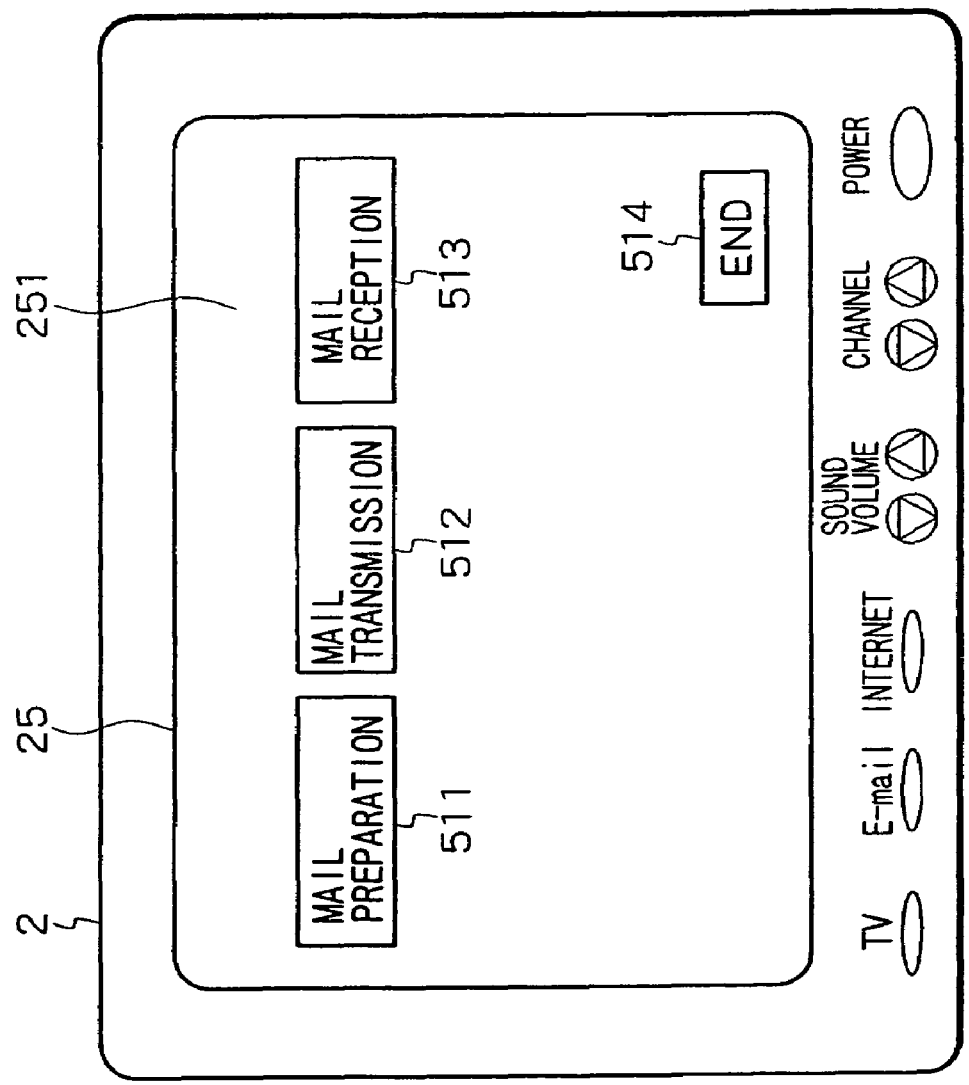
FIG. 5 is a similar view but showing an initial screen for processing an electronic mail used by the display apparatus of FIG. 4, according to the first embodiment of the present invention.

When the processing program for an electronic mail is executed, the control section 200 uses the information stored in the ROM 202 to display an initial screen for processing regarding an electronic mail. FIG. 5 shows the initial screen for processing regarding an electronic mail displayed on the LCD apparatus 25 of the display apparatus 2.

Referring to FIG. 5, the initial screen shown includes a mail preparation icon 511 for inputting an instruction to execute a mail preparation process, a mail transmission icon 512 for inputting an instruction to execute a transmission process of a prepared electronic mail, a mail reception icon 513 for inputting an instruction to execute a reception process of an electronic mail destined for the user, and an end icon 514 for ending the processing regarding an electronic mail.

If the user of the display apparatus 2 touches a portion of the touch panel 251 corresponding to a displayed position of an icon for an object process using a finger or a touch pen to select the object process, then the control section 200 of the display apparatus 2 discriminates the process selected by the user from the position of the touch panel 251 touched by the user and the display positions of the icons and executes the selected process.

If the mail preparation icon 511 is selected by the user on the initial screen for processing of an electronic mail of FIG. 5, then the control section 200 of the display apparatus 2 executes the preparation process of an electronic mail. In this instance, the control section 200 uses font information and so forth stored in the ROM 202 to display the preparation screen of an electronic mail on the LCD apparatus 25.

Figure 6:
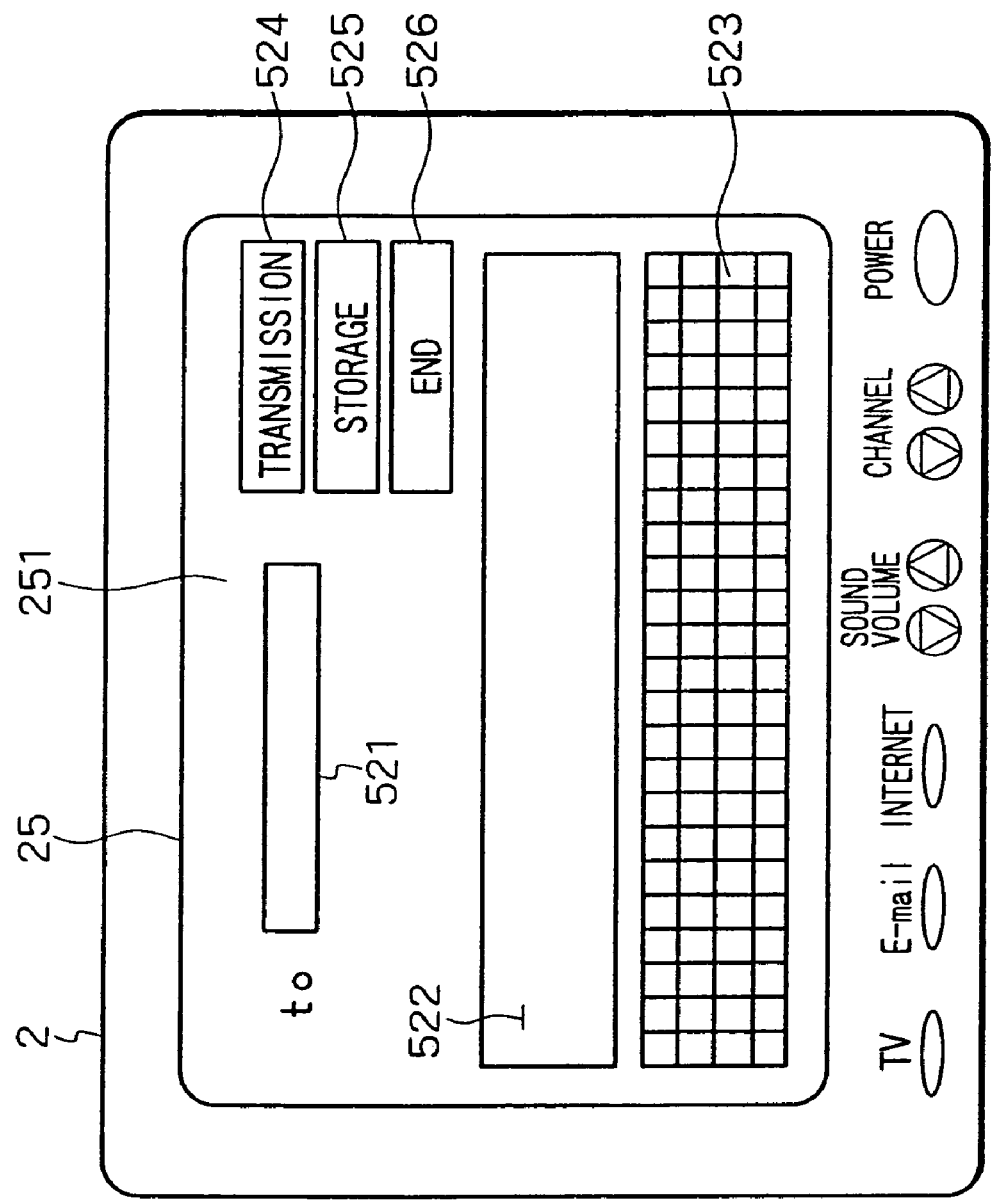
FIG. 6 is a similar view but showing an electronic mail preparation screen used by the display apparatus of FIG. 4, according to the first embodiment of the present invention.

FIG. 6 shows the preparation screen of an electronic mail used by the display apparatus 2. Referring to FIG. 6, the preparation screen of an electronic mail used by the display apparatus 2 includes a display of a mail address inputting column 521 for a transmission destination, an inputting column 522 for the text of an electronic mail, a software keyboard 523 for inputting a character in response to a touched position, a transmission icon 524 for inputting an instruction to transmit a prepared electronic mail, a storage icon 525 for inputting an instruction to store a prepared electronic mail, and an end icon 526 for ending the preparation process of an electronic mail.

In the display apparatus 2, information can be inputted to an inputting column for information to be inputted by touching the inputting column with a finger or the like, and a mail address and a mail text are inputted through the software keyboard 523 to prepare an electronic mail to be transmitted to an object destination of transmission.

It is to be noted that the software keyboard 523 to be displayed on the LCD unit 25 includes a Japanese cursive kana character inputting mode, a Japanese katakana inputting mode and an alphabet inputting mode and so forth such that an inputting method favorable to the user can be selectively used.

Then, if the transmission icon 524 displayed at the right upper corner of the display screen in FIG. 6 is selected when the preparation of an electronic mail is completed, then the control section 200 of the display apparatus 2 forms an electronic mail transmission request including a telephone number of an ISP and a personal identification number (authentication number) of the user itself stored in advance in the EEPROM 204 and transmits the electronic mail transmission request by radio to the channel selection apparatus 1.

In this instance, when the channel selection apparatus 1 receives the electronic mail transmission request from the display apparatus 2, it uses the telephone number of the ISP and the personal identification number of the user included in the electronic mail transmission request to connect a telephone circuit to the ISP. Since success/failure of connection of a telephone circuit is transmitted from the channel selection apparatus 1 to the display apparatus 2, the display apparatus 2 can discriminate whether or not a telephone circuit has been connected successfully.

Then, if the display apparatus 2 is informed from the channel selection apparatus 1 that a telephone circuit is connected, then it transmits a mail address of the transmission destination of the electronic mail and the text of the electronic mail by radio to the channel selection apparatus 1. The channel selection apparatus 1 transmits the electronic mail from the display apparatus 2 to a mailbox of the object party through the ISP to which the telephone circuit is connected. Consequently, immediately after an electronic mail is prepared, the prepared electronic mail can be transmitted to a mail box of the object party of transmission through the Internet.

Then, after the transmission is completed, the electronic mail preparation screen shown in FIG. 6 is restored so that preparation of a new electronic mail can be performed.

Further, in the display apparatus 2, if the storage icon 525 displayed at the right upper corner of the electronic mail preparation screen shown in FIG. 6 is selected, then the control section 200 of the display apparatus 2 stores the electronic mail prepared in the inputting column 522 into the EEPROM 204 which is a nonvolatile memory and can perform preparation of a next electronic mail or end preparation of an electronic mail.

Furthermore, in the display apparatus 2, if the end icon 526 displayed at the right upper corner of the electronic mail preparation screen shown in FIG. 6 is selected, then the control section 200 of the display apparatus 2 ends the electronic mail preparation process without performing any of transmission and storage of an electronic mail, and the initial screen for processing regarding an electronic mail shown in FIG. 5 is restored.

In this manner, if the mail preparation icon 511 is selected on the initial screen shown in FIG. 5, then preparation of an electronic mail and transmission and storage of the prepared electronic mail can be performed.

On the other hand, if the mail transmission icon 512 is selected by the user on the initial screen for processing of an electronic mail shown in FIG. 5, then the control section 200 of the display apparatus 2 produces a prepared electronic mail list which is a list of prepared electronic mails stored in the EEPROM 204 already and controls the LCD unit 25 to display the electronic mail list so that an object prepared electronic mail can be selected from within the electronic mail list and transmitted.

Figure 7:
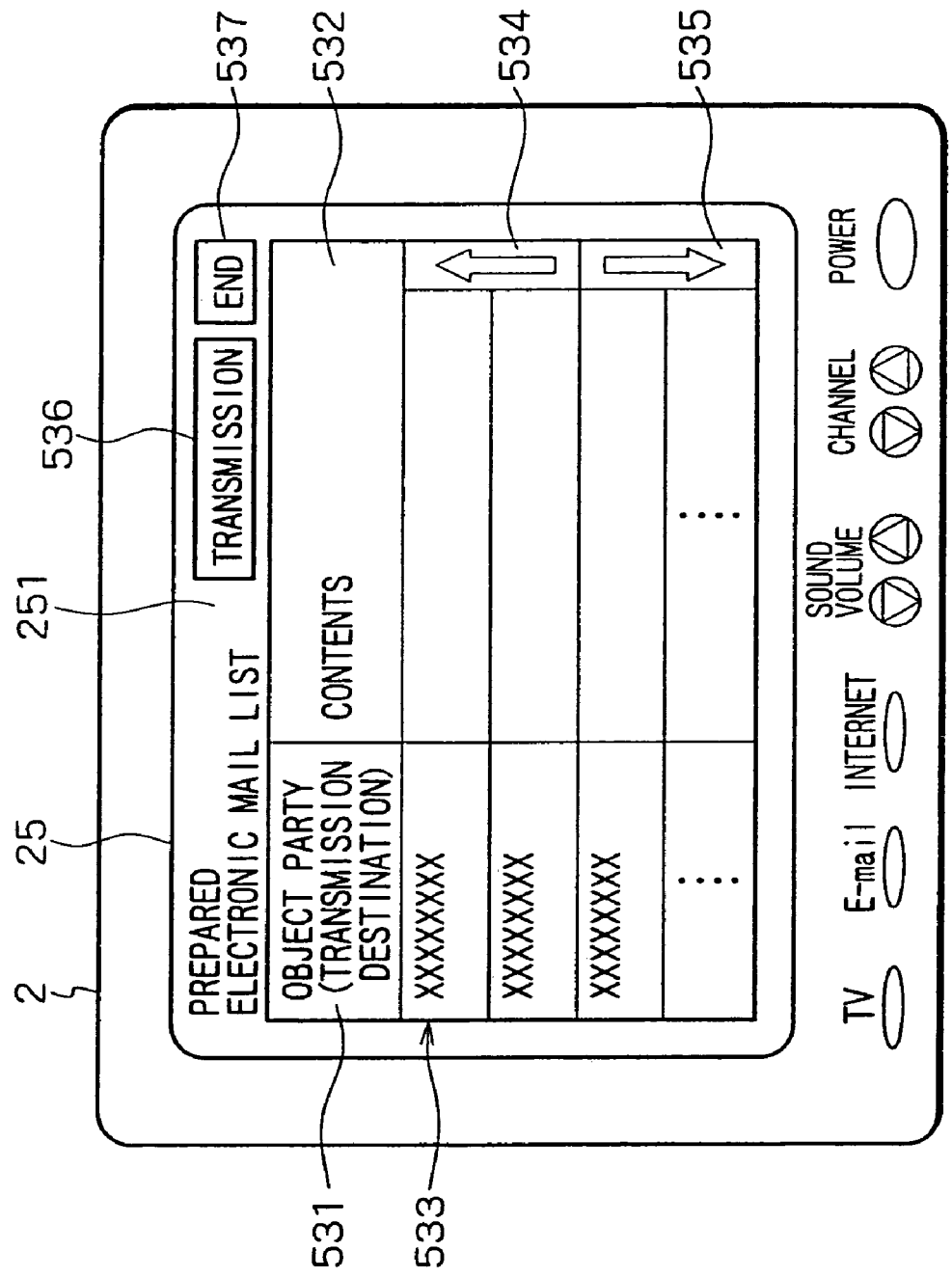
FIG. 7 is a similar view but showing a screen for transmission of a prepared electronic mail used by the display apparatus of FIG. 4, according to the first embodiment of the present invention.

FIG. 7 shows the prepared electronic mail list used by the display apparatus 2 of the present embodiment. As described hereinabove, if the mail transmission icon 512 is selected by the user on the initial screen for processing of an electronic mail, then the control section 200 of the display apparatus 2 produces such a prepared electronic mail list as shown in FIG. 7 based on the prepared electronic mails stored in the EEPROM 204 and displays the prepared electronic mail list on the LCD unit 25.

As shown in FIG. 7, the prepared electronic mail list used in the display apparatus 2 of the present embodiment has an object party (transmission destination) column 531 for a mail address, a name or the like, and a contents column 532 for indicating, for example, the top 2 or 3 rows of an electronic mail text of a prepared electronic mail.

In the prepared electronic mail list, the upward scroll icon 534 and the downward scroll icon 535 are provided as seen in FIG. 7. If the user touches a portion of the touch panel 251 corresponding to the displayed position of the upward scroll icon 534 or the downward scroll icon 535 with its finger or a touch pen, then the control section 200 of the display apparatus 2 detects the touched position of the touch panel 251 and scrolls the prepared electronic mail list upwardly or downwardly. Consequently, all of the prepared electronic mails stored in the EEPROM 204 can be displayed in a list.

Then, if an object prepared electronic mail to be transmitted is found out, then the user will touch a portion of the touch panel 251 corresponding to the displayed position of the object prepared electronic mail with its finger or the touch pen. The control section 200 of the display apparatus 2 detects the touched position of the touch panel 251 and moves a cursor 533 to the top of the display column of the selected prepared electronic mail.

Then, when the prepared electronic mail at which the cursor 533 is positioned is to be transmitted, the user will touch a portion of the touch panel 251 corresponding to the displayed position of a transmission icon 536 displayed at the right upper corner of the prepared electronic mail list with its finger or the touch pen. Consequently, the control section 200 of the display apparatus 2 forms an electronic mail transmission request and transmits it by radio toward the channel selection apparatus 1 in a similar manner as in transmission of an electronic mail prepared on the electronic mail preparation screen of FIG. 6.

When the channel selection apparatus 1 receives the electronic mail transmission request, it uses the telephone number of the ISP and the personal identification number included in the electronic mail transmission request to connect a telephone circuit to the object ISP. Then, the channel selection apparatus 1 transmits a result of the connection by radio to the display apparatus 2.

Then, if a notification that a telephone circuit has been connected to the object ISP is received from the channel selection apparatus 1, then the display apparatus 2 transmits a mail address of the transmission destination of the selected prepared electronic mail and the text of the electronic mail to the channel selection apparatus 1 by radio. The channel selection apparatus 1 transmits the information from the display apparatus 2 to the mail box of the object party through the ISP. Consequently, the object prepared electronic mail from among the prepared electronic mails stored in the EEPROM 204 can be transmitted to the mail box of the object part through the Internet.

Further, if the end icon 537 displayed at a right upper corner portion of the prepared electronic mail list shown in FIG. 7 on the display apparatus 2 is selected, then the control section 200 of the display apparatus 2 ends the electronic mail transmission process and restores the initial screen for the processing of an electronic mail shown in FIG. 5.

It is to be noted that, if the display apparatus 2 receives a notification that a telephone circuit has not been connected successfully to the object ISP, then the display apparatus 2 restores the display of the prepared electronic mail list to allow acceptance of another input for selection or transmission instruction.

In this manner, if the mail transmission icon 512 is selected on the initial screen shown in FIG. 5, then an object electronic mail can be selected from among prepared electronic mails stored in the EEPROM 204 and transmitted.

Further, in the present embodiment, if the mail reception icon 513 is selected by the user on the initial screen for an electronic mail process shown in FIG. 5, then the control section 200 of the display apparatus 2 displays a confirmation inputting screen for confirmation of whether or not an electronic mail arriving at the mail box of the server apparatus of the ISP to which the user is a subscriber should be read.

Figure 8:
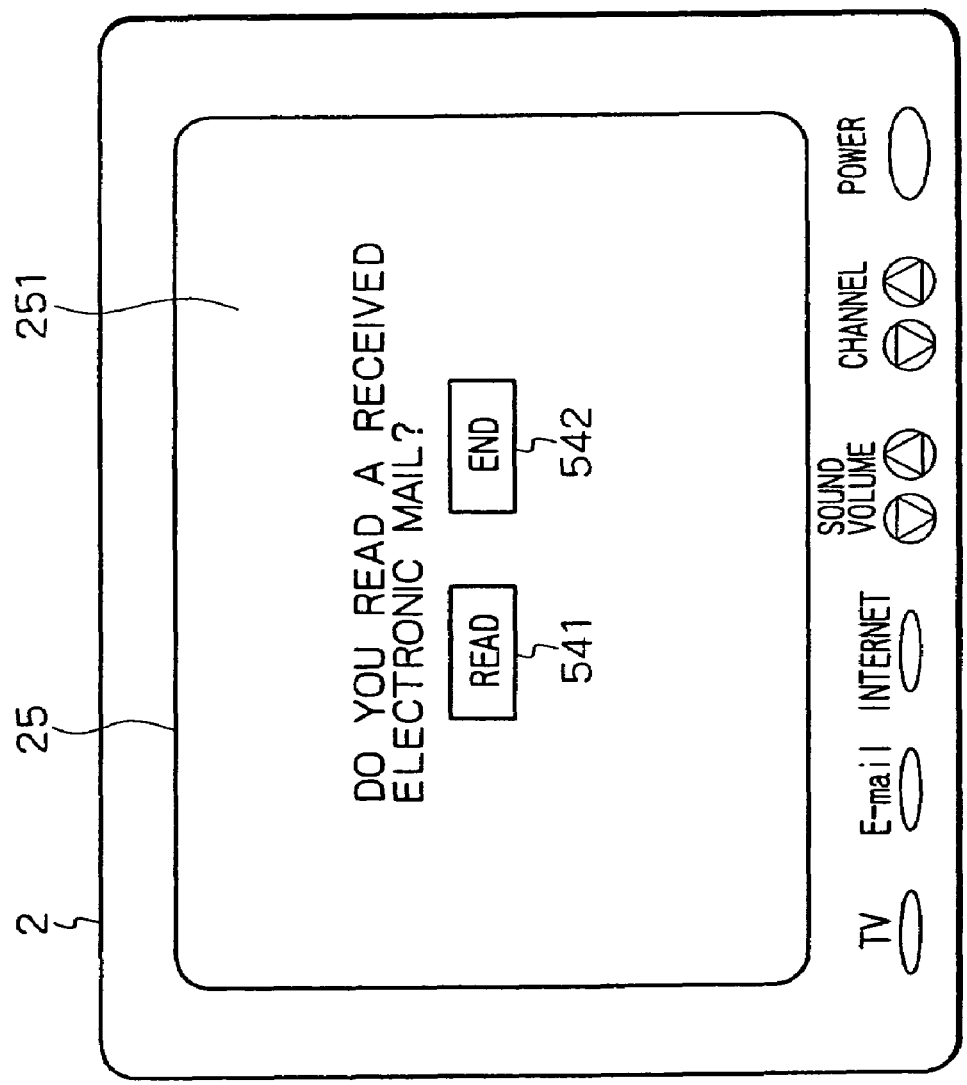
FIG. 8 is a similar view but showing a screen for downloading an electronic mail used by the display apparatus of FIG. 4, according to the first embodiment of the present invention.

FIG. 8 shows the conformation inputting screen used by the display apparatus 2 to confirm whether or not the user should read an electronic mail destined for the user. As described hereinabove, if the mail reception icon 513 is selected by the user on the initial screen for an electronic mail process, then the control section 200 of the display apparatus 2 prepares such a confirmation inputting screen as shown in FIG. 8 and displays it on the LCD apparatus 25.

As seen from FIG. 8, the confirmation inputting screen used by the display apparatus 2 to confirm whether or not an electronic mail should be read includes a read icon 541 for inputting an instruction by the user to download an electronic mail destined for the user itself and read it, and an end icon 542 for ending the processing by the user to download an electronic mail destined for the user itself and read it.

Then, if the user touches the touch panel 251 corresponding to the displayed position of the end icon 542 on the confirmation inputting screen shown in FIG. 8 with its finger or a touch pen, then the control section 200 of the display apparatus 2 ends the electronic mail reception process and restores the initial screen for an electronic mail process shown in FIG. 5.

On the other hand, if the user touches the touch panel 251 corresponding to the displayed position of the read icon 541 on the confirmation inputting screen shown in FIG. 8 with its finger or a touch pen, then the control section 200 of the display apparatus 2 executes an electronic mail reception process as described below. In particular, if the read icon 541 is selected on the confirmation inputting screen shown in FIG. 8, then the control section 200 of the display apparatus 2 forms an electronic mail provision request including the telephone number of the ISP and the personal identification number (authentication number) of the user itself stored in advance in the EEPROM 204 and transmits the electronic mail provision request by radio to the channel selection apparatus 1.

When the channel selection apparatus 1 receives the electronic mail provision request from the display apparatus 2, the channel selection apparatus 1 uses the telephone number of the ISP and the personal identification number included in the electronic mail provision request to connect a telephone circuit to the object ISP to request the ISP to provide an electronic mail destined for the user from which the electronic mail provision request has been transmitted. Then, the channel selection apparatus 1 transmits a result of the connection and, if the connection is established successfully, an electronic mail provided from the ISP and destined for the user to the display apparatus 2 by radio.

Figure 9:
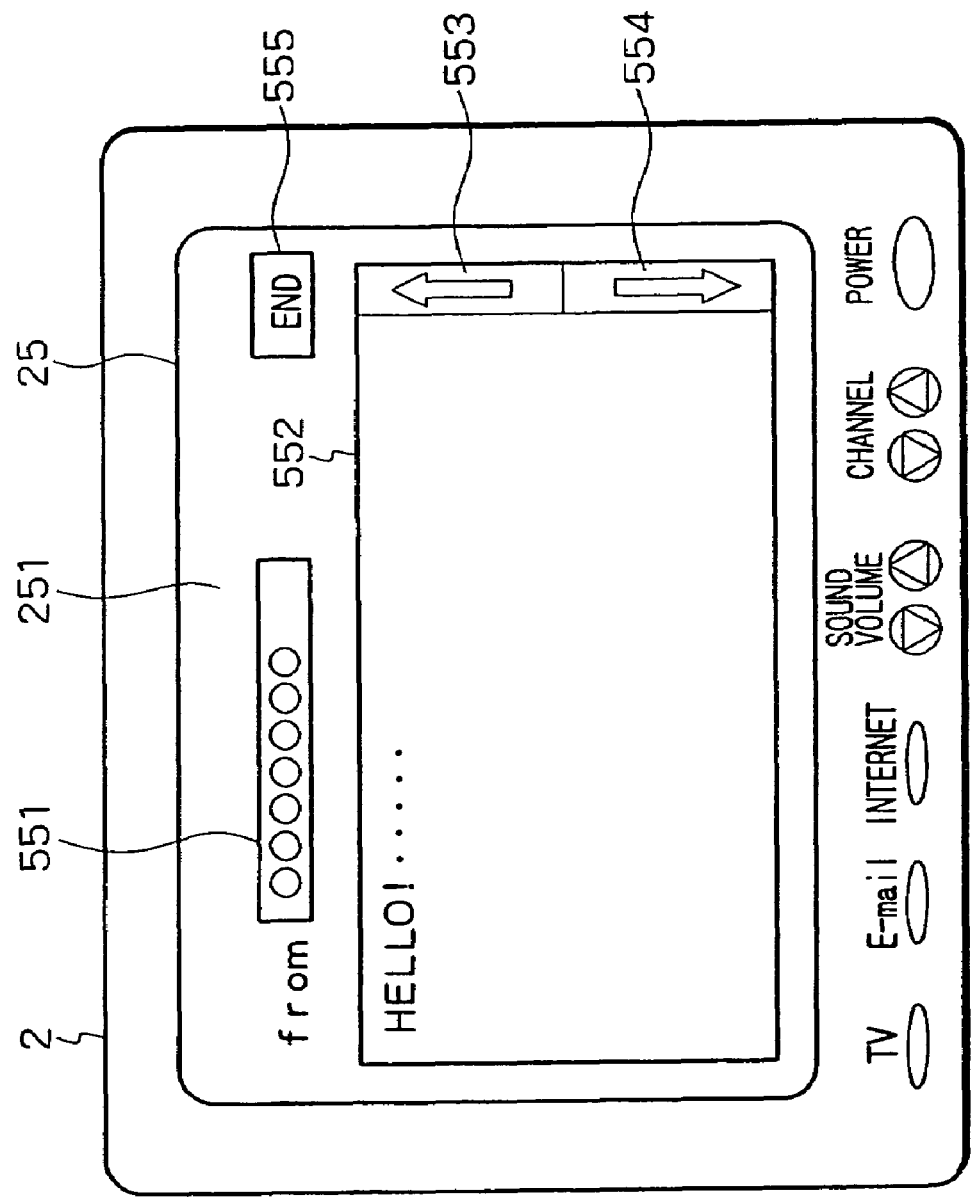
FIG. 9 is a similar view but showing a display screen for a downloaded electronic mail used by the display apparatus of FIG. 4, according to the first embodiment of the present invention.

Then, if the electronic mail destined for the user is transmitted from the channel selection apparatus 1 to the display apparatus 2 by radio, then the display apparatus 2 receives the electronic mail, forms a display screen for the received electronic mail based on the received information as shown in FIG. 9, and displays the display screen on the LCD apparatus 25.

FIG. 9 shows the display screen for a received electronic mail used by the display apparatus 2. Referring to FIG. 9, the display screen for a received electronic mail includes an origination source display column 551 for the mail address or the name of the origination source and a display column 552 for the text of an electronic mail.

The display column 552 for an electronic mail includes an upward scroll icon 553 and a downward scroll icon 554 as shown in FIG. 9. If the user touches the touch panel 251 corresponding to the displayed position of the upward scroll icon 553 or the downward scroll icon 554 with its finger or a touch pen, then the control section 200 of the display apparatus 2 detects the touched position of the touch panel 251 and scrolls the text of an electronic mail displayed on the display column 552 so that the entire electronic mail text can be displayed.

It is to be noted that, in the present embodiment, if a plurality of electronic mails destined for the user arrive, then all of them can be fetched and displayed successively. Then, when the user completes its reading of the electronic mail or mails destined for the user itself, the user can touch the touch panel 251 corresponding to the displayed position of an end icon 555 displayed at a right upper corner portion of the display screen for a received electronic mail shown in FIG. 8 with its finger or a touch pen to end the display of an electronic mail or mails destined for the user itself. Thus, the initial screen for an electronic mail process shown in FIG. 5 is restored.

In this manner, by selecting the mail reception icon 513 on the initial screen shown in FIG. 5, the user can download an electronic mail destined for the user from the mail box of the ISP, to which the user is a subscriber, to the display apparatus 2 through the channel selection apparatus 1 and display and observe the downloaded electronic mail on the LCD apparatus 25 of the display apparatus 2.

[Processing of the Display Apparatus 2 Regarding an Electronic Mail]

Figure 10:
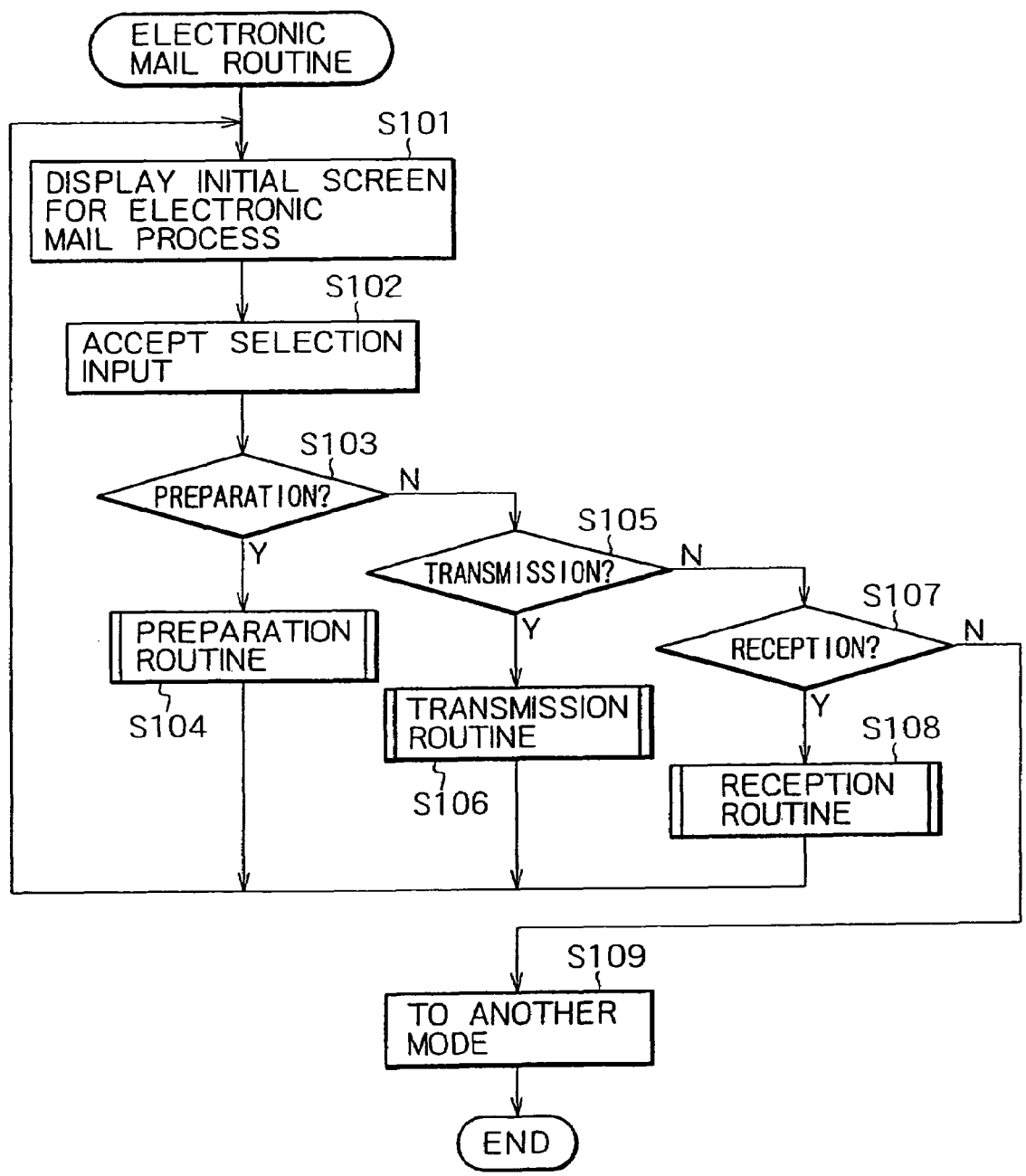
FIG. 10 is a flow chart illustrating an electronic mail routine executed by the display apparatus of FIG. 3, according to the first embodiment of the present invention.

The electronic mail preparation, transmission and reception processes described above are described more particularly with reference to the flow charts of FIGS. 10 to 13. First, a general process regarding an electronic mail performed by the display apparatus 2 is described. FIG. 10 illustrates the process regarding an electronic mail executed by the display apparatus 2.

The process of the flow chart of FIG. 10 is started when the main power supply to the display apparatus 2 is made available and the E-mail key 295 is depressed as described hereinabove. When the E-mail key 295 is depressed, the control section 200 of the display apparatus 2 displays the initial screen for a process regarding an electronic mail shown in FIG. 5 (step S101) and accepts a selection input of the icons for preparation, transmission, reception and ending (step S102).

Then, the control section 200 discriminates whether or not the mail preparation icon 511 is selected (step S103). If the control section 200 discriminates that the mail preparation icon 511 is selected, then it executes an electronic mail preparation routine for performing an electronic mail preparation process (step S104).

After the electronic mail preparation routine in step S104 comes to an end, the control section 200 returns its processing to step S101 to display the initial screen for an electronic mail process to allow selection of preparation, transmission or reception of an electronic mail or ending again so that similar processing may be repeated.

If the control section 200 discriminates in step S103 that the mail preparation icon 511 is not selected, then it discriminates whether or not the mail transmission icon 512 is selected (step S105). If the control section 200 discriminates in step S105 that the mail transmission icon 512 is selected, then it executes an electronic mail transmission routine for transmitting an object electronic mail from among prepared electronic mails (step S106).

Also after the electronic mail transmission routine in step S106 comes to an end, the control section 200 returns its processing to step S101 to display the initial screen for an electronic mail process to allow selection of preparation, transmission or reception of an electronic mail or ending again so that similar processing may be repeated similarly as after the electronic mail preparation routine described above comes to an end.

If the control section 200 discriminates in step S105 that the mail transmission icon 512 is not selected, then it discriminates whether or not the mail reception icon 513 is selected (step S107). If the control section 200 discriminates in step S107 that the mail reception icon 513 is selected, then it executes an electronic mail reception routine for downloading an electronic mail destined for the user itself (step S108).

Also after the electronic mail reception routine in step S108 comes to an end, the control section 200 returns its processing to step S101 to display the initial screen for an electronic mail process to allow selection of preparation, transmission or reception of an electronic mail or ending again so that similar processing may be repeated similarly as after the electronic mail preparation routine described above comes to an end.

If it is discriminated in step S107 that the mail reception icon 513 is not selected, then the control section 200 discriminates that the end icon 514 is selected and places the display apparatus 2 into a television mode for reception of a broadcasting signal from the channel selection apparatus 1, thereby ending the electronic mail process illustrated in FIG. 10.

Also when the TV key 294, E-mail key 295 or Internet key 296 is depressed in step S102, the control section 200 discriminates that an instruction to end the process regarding an electronic mail is inputted, and places the display apparatus 2 into a mode corresponding to the depressed key.

In this manner, the display apparatus 2 can be used to prepare, transmit and receive an electronic mail. In the following, preparation, transmission and reception of an electronic mail are individually described in detail.

[Electronic Mail Preparation Process]

Figure 11:
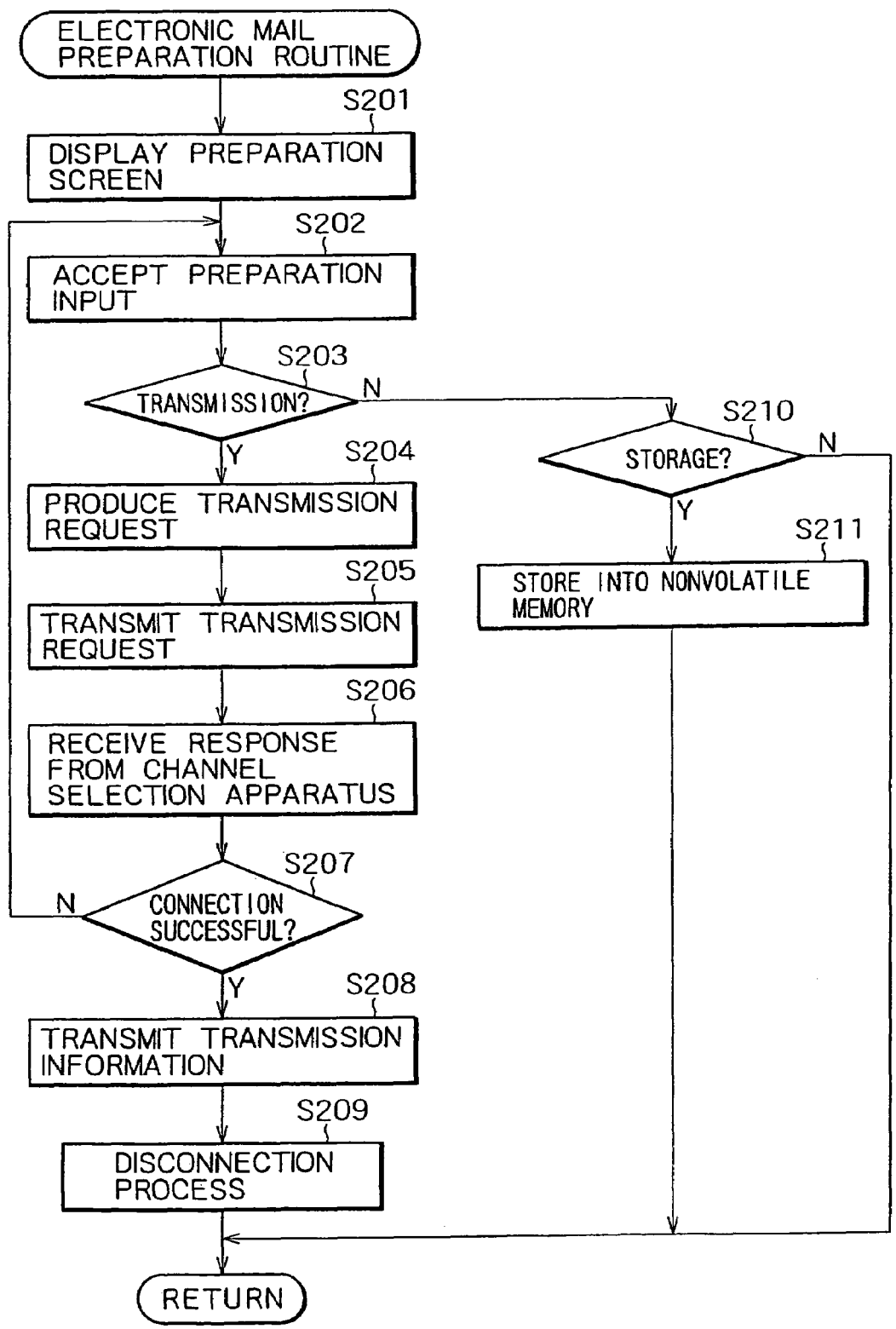
FIG. 11 is a flow chart illustrating an electronic mail preparation routine executed by the display apparatus of FIG. 3, according to the first embodiment of the present invention.

FIG. 11 illustrates the electronic mail preparation process executed in step S104 shown in FIG. 10. The electronic mail preparation process is executed when the mail preparation icon 511 is selected on the initial screen (FIG. 5) for a process regarding an electronic mail displayed on the LCD apparatus 25 of the display apparatus 2 as described hereinabove.

When the mail preparation icon 511 is selected, the control section 200 of the display apparatus 2 displays the electronic mail preparation screen shown in FIG. 6 (step S201) and accepts an electronic mail preparation input through the software keyboard 523 (step S202). The accepted input information is temporarily stored into the RAM 203. In other words, an electronic mail is prepared in the RAM 203.

Then, if one of the transmission icon 524, storage icon 525 and end icon 526 displayed at a right upper corner portion of the electronic mail preparation screen is selected, then the control section 200 discriminates that inputting of an electronic mail comes to an end and discriminates whether or not the transmission icon 524 is selected (step S203).

If it is discriminated in step S203 that the transmission icon 524 is selected, then the control section 200 produces an electronic mail transmission request including necessary information such as the telephone number of the ISP and the personal identification number stored in advance in the EEPROM 204 as described above (step S204) and transmits the electronic mail transmission request by radio to the channel selection apparatus 1 through the transmission signal formation section 28, transmission processing section 22S, multicoupler 22K and transmission/reception antenna 21 (step S205).

In response to the electronic mail transmission request, the channel selection apparatus 1 performs a connection process of a telephone circuit to the ISP, to which the user is a subscriber, through the modem section 110 and transmits a result of the connection by radio. Thus, the display apparatus 2 receives the response from the channel selection apparatus 1 (step S206). In this instance, the response from the channel selection apparatus 1 is supplied to the control section 200 through the reception processing section 22R of the display apparatus 2.

Then, the control section 200 discriminates whether or not a telephone line is connected between the channel selection apparatus 1 and the object ISP in accordance with the electronic mail transmission request (step S207). If the control section 200 discriminates in step S207 that a telephone line is connected, then the control section 200 transmits the electronic mail prepared in the RAM 203 to the channel selection apparatus 1 by radio through the transmission signal formation section 28, transmission processing section 22S, multicoupler 22K and transmission/reception antenna 21 (step S208).

Then, after the transmission of the prepared electronic mail to the channel selection apparatus 1 comes to an end, the control section 200 forms and transmits a telephone circuit disconnection request to the channel selection apparatus 1 to execute a disconnection process for disconnecting the telephone line connected between the channel selection apparatus 1 and the ISP (step S209), thereby ending the electronic mail preparation process illustrated in FIG. 11.

It is to be noted that, if it is discriminated in step S207 that the response from the channel selection apparatus 1 represents that a telephone line is not connected successfully, then the control section 200 returns the processing to step S202 to repeat the processing beginning with step S202. In this instance, if the transmission icon 524 is selected again, then transmission of the electronic mail prepared in the RAM 203 can be retried. On the other hand, if the storage icon 525 is selected, then the electronic mail prepared in the RAM 203 can be stored as described hereinabove.

If it is discriminated in step S203 that the transmission icon 524 is not selected on the electronic mail preparation screen shown in FIG. 6, then the control section 200 of the display apparatus 2 discriminates whether or not the storage icon 525 is selected (step S210).

If it is discriminated in step S210 that the storage icon 525 is selected, then the control section 200 stores the electronic mail prepared in the RAM 203 into the EEPROM 204 which is a nonvolatile memory (step S211). Consequently, the electronic mail prepared in the RAM 203 through the electronic mail preparation screen can be kept stored in the EEPROM 204 even after the main power supply to the display apparatus 2 is disconnected so that it can be transmitted later.

After the electronic mail is stored into the EEPROM 204 in step S211, the control section 200 ends the process illustrated in FIG. 11. Further, if it is discriminated in step S210 that the storage icon 525 is not selected, then the control section 200 of the display apparatus 2 discriminates that the end icon 526 is selected, and consequently ends the process illustrated in FIG. 11 without performing transmission or storage of the electronic mail and thus returns its processing to the process illustrated in FIG. 10.

[Electronic Mail Transmission Process]

Figure 12:
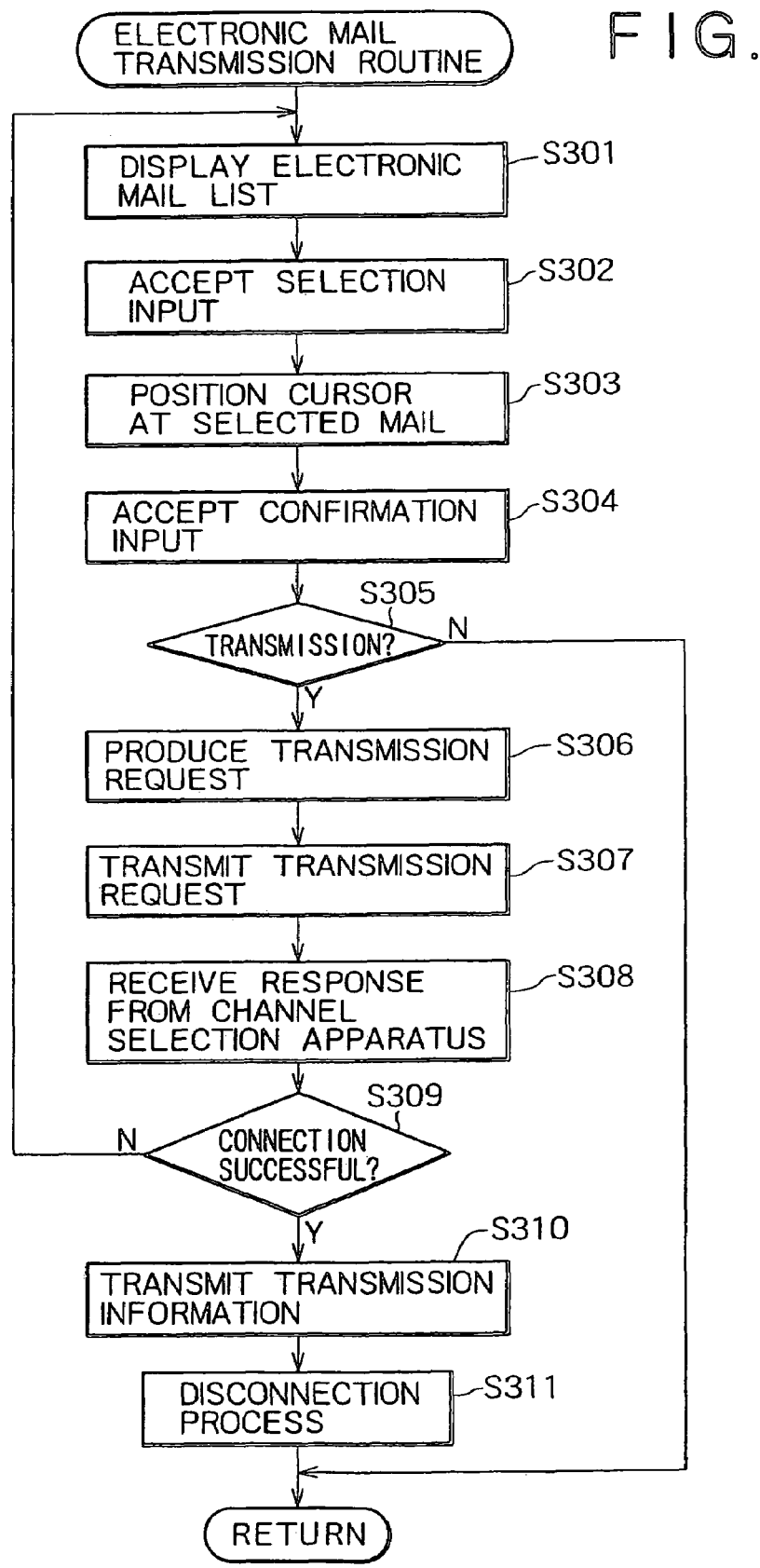
FIG. 12 is a flow chart illustrating a prepared electronic mail transmission routine executed by the display apparatus of FIG. 3, according to the first embodiment of the present invention.

FIG. 12 illustrates the electronic mail transmission process executed in step S106 of FIG. 10. The process is executed when the mail transmission icon 512 is selected on the initial screen (FIG. 5) for a process regarding an electronic mail displayed on the LCD apparatus 25 of the display apparatus 2 as described hereinabove.

If the mail transmission icon 512 is selected, then the control section 200 of the display apparatus 2 displays such a prepared electronic mail list as shown in FIG. 7 on the LCD apparatus 25 of the display apparatus 2 (step S301) and accepts a selection input of a prepared electronic mail to be transmitted (step S302).

Then, the control section 200 positions the cursor 533 to the displayed position of the selected prepared electronic mail (step S303) and accepts a confirmation input of whether or not the selected prepared electronic mail should be transmitted (step. S304). Then, the control section 200 discriminates whether or not the transmission icon 536 displayed at a right upper corner portion of the prepared electronic mail list shown in FIG. 7 in step S304 is selected (step S305).

If it is discriminated in step S305 that the transmission icon 536 is selected, then similarly as in the processing beginning with step S204 illustrated in FIG. 11, the control section 200 produces an electronic mail transmission request including necessary information such as the telephone number of the ISP and the personal identification number stored in advance in the EEPROM 204 (step S306) and transmits the electronic mail transmission request by radio to the channel selection apparatus 1 through the transmission signal formation section 28, transmission processing section 22S, multicoupler 22K and transmission/reception antenna 21 (step S307).

In response to the electronic mail transmission request, the channel selection apparatus 1 performs a connection process of a telephone circuit to the ISP, to which the user is a subscriber, through the modem section 110 and transmits a result of the connection by radio. Thus, the display apparatus 2 receives the response from the channel selection apparatus 1 (step S308). In this instance, the response from the channel selection apparatus 1 is supplied to the control section 200 through the reception processing section 22R of the display apparatus 2.

Then, the control section 200 discriminates whether or not a telephone line is connected between the channel selection apparatus 1 and the object ISP in accordance with the electronic mail transmission request (step S309). If the control section 200 discriminates in step S309 that a telephone line is connected, then the control section 200 reads out the selected prepared electronic mail from the EEPROM 204 and transmits it to the channel selection apparatus 1 by radio through the transmission signal formation section 28, transmission processing section 22S, multicoupler 22K and transmission/reception antenna 21 (step S310).

Then, after the transmission of the selected prepared electronic mail to the channel selection apparatus 1 comes to an end, the control section 200 forms and transmits a telephone circuit disconnection request to the channel selection apparatus 1 to execute a disconnection process for disconnecting the telephone line connected between the channel selection apparatus 1 and the ISP (step S311), thereby ending the process illustrated in FIG. 12 and returning the processing to the process illustrated in FIG. 10.

It is to be noted that, if it is discriminated in step S309 that the response from the channel selection apparatus 1 represents that a telephone line is not connected successfully, then the control section 200 returns the processing to step S301 to repeat the processing beginning with step S301. Therefore, if the transmission icon 524 is selected, then transmission of a selected prepared electronic mail can be performed again.

If it is discriminated in step S305 that the transmission icon 536 is not selected from within the prepared electronic mail list shown in FIG. 7, then the control section 200 discriminates that an end icon 537 is selected and ends the process illustrated in FIG. 12.

[Electronic Mail Reception Process]

Figure 13:
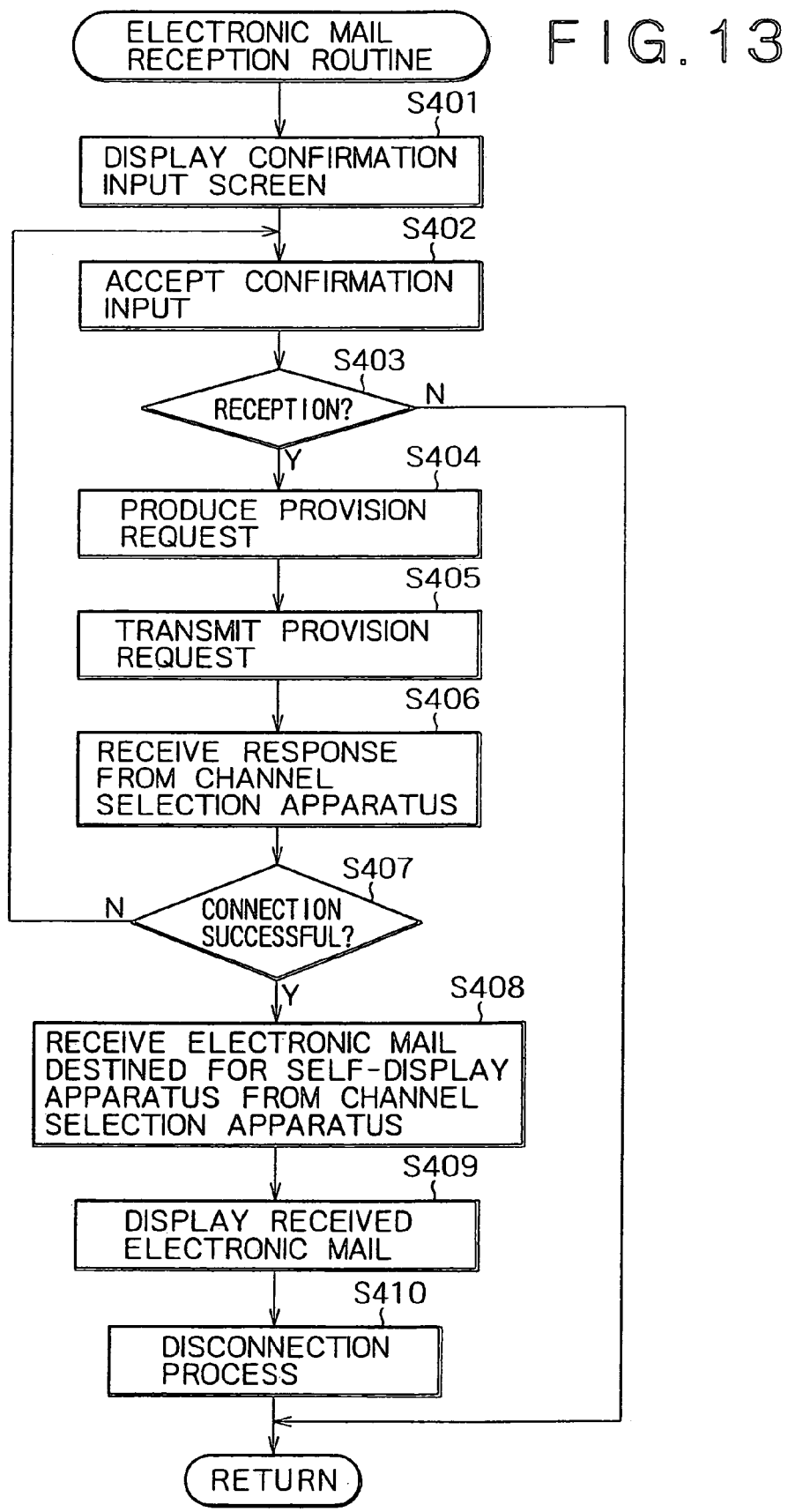
FIG. 13 is a flow chart illustrating an electronic mail reception routine (downloading routine) executed by the display apparatus of FIG. 3, according to the first embodiment of the present invention.

FIG. 13 illustrates the electronic mail reception process executed in step S108 of FIG. 10. The process is executed when the mail reception icon 513 is selected on the initial screen (FIG. 5) for a process regarding an electronic mail displayed on the LCD apparatus 25 of the display apparatus 2 as described hereinabove.

If the mail reception icon 513 is selected, then the control section 200 of the display apparatus 2 displays such a confirmation inputting screen as shown in FIG. 8 on the LCD apparatus 25 of the display apparatus 2 (step S401) and accepts an input of instruction of whether or not an electronic mail destined for the user should be downloaded and read (step S402).

Then, the control section 200 discriminates whether or not the read icon 541 is selected on the confirmation inputting screen shown in FIG. 8 to issue an instruction to receive an electronic mail destined for the user (step S403). If it is discriminated in step S403 that an instruction to receive an electronic mail destined for the user is issued, then the control section 200 produces an electronic mail provision request including the telephone number of the ISP and the personal identification number stored in the EEPROM 204 (step S404).

Then, the control section 200 transmits the electronic mail provision request formed in step S404 to the channel selection apparatus 1 through the transmission signal formation section 28, transmission processing section 22S, multicoupler 22K and transmission/reception antenna 21 (step S405).

In response to the electronic mail provision request, the channel selection apparatus 1 performs a connection process of a telephone circuit to the ISP, to which the user is a subscriber, through the modem section 110 and transmits a result of the connection by radio. Thus, the display apparatus 2 receives the response from the channel selection apparatus 1 (step S406). In this instance, the response from the channel selection apparatus 1 is supplied to the control section 200 through the reception processing section 22R of the display apparatus 2.

Then, the control section 200 discriminates whether or not a telephone line is connected between the channel selection apparatus 1 and the object ISP in accordance with the electronic mail provision request (step S407). If the control section 200 discriminates in step S407 that a telephone line is connected, then since an electronic mail destined for the user is soon transmitted by radio from the channel selection apparatus 1, the control section 200 receives the electronic mail (step S408).

Then, the control section 200 stores the received electronic mail into a memory such as the RAM 203 and displays it on the LCD apparatus 25 as seen in FIG. 9 (step 409) to provide the electronic mail to the user. After all electronic mail or mails destined for the user are fetched into the display apparatus 2 so that they can be displayed, the control section 200 forms and transmits a telephone circuit disconnection request by radio to the channel selection apparatus 1 to execute a disconnection process for disconnecting the telephone line connected between the channel selection apparatus 1 and the ISP (step S410), thereby ending the process illustrated in FIG. 13.

It is to be noted that, if it is discriminated in step S407 that the response from the channel selection apparatus 1 represents that a telephone line is not connected successfully, then the control section 200 returns the processing to step S402 to repeat the processing beginning with step S402 to accept a confirmation input again.

If it is discriminated in step S403 that the read icon 541 is not selected, then the control section 200 discriminates that the end icon 542 is selected and ends the process illustrated in FIG. 13.

[Processing of the Channel Selection Apparatus 1 Regarding an Electronic Mail]

Now, processing of the channel selection apparatus 1 for connecting a telephone circuit to make it possible to transmit and receive an electronic mail in response to a request from the display apparatus 2 as described above is described with reference to FIG. 14.

Figure 14:
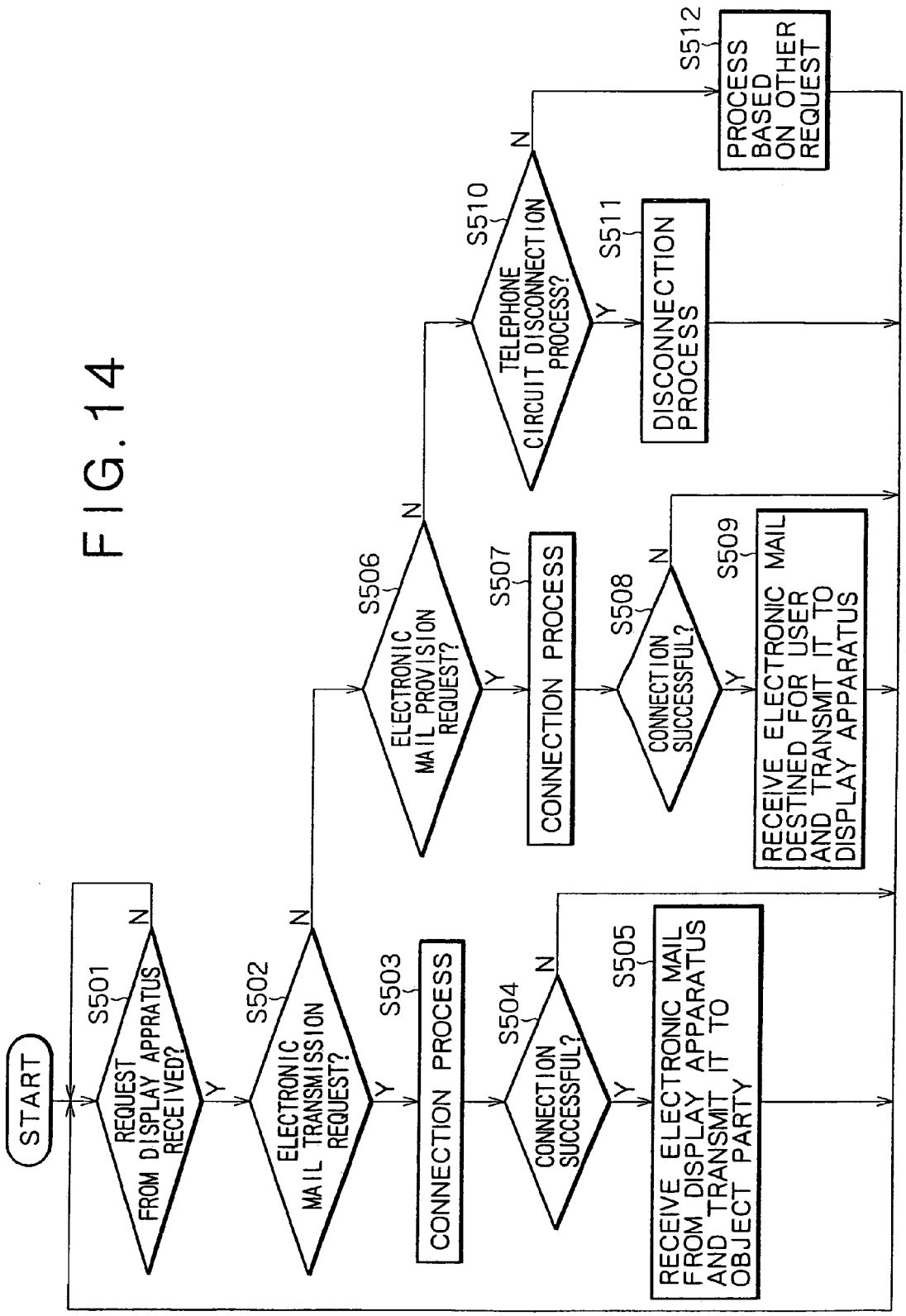
FIG. 14 is a flow chart illustrating a process executed by the channel selection apparatus of FIG. 2 in response to instruction information from the display apparatus of FIG. 3, according to the first embodiment of the present invention.

After the power supply to the channel selection apparatus 1 is made available, the control section 100 of the channel selection apparatus 1 starts execution of the process illustrated in FIG. 14. The control section 100 of the channel selection apparatus 1 supervises a signal from the reception processing section 17R to discriminate whether or not a request transmitted by radio from the display apparatus 2 is received (step S501). The discrimination process in step S501 is performed repetitively until a request transmitted by radio from the display apparatus 2 is received.

If it is discriminated in step S501 that a request from the display apparatus 2 is received, then the control section 100 discriminates whether or not the received request from the display apparatus 2 is a transmission request to transmit an electronic mail to the object party (step S502).

If it is discriminated in step S501 that the received request from the display apparatus 2 is a transmission request to transmit an electronic mail, then the control section 100 executes a connection process wherein it uses a telephone number of an ISP, a personal identification umber and so forth included in the transmission request received from the display apparatus 2 to originate a telephone call to the object ISP through the modem section 110 and the telephone line L to connect a telephone circuit, confirms a response from the ISP and transmits a notification of a result of the connection to the display apparatus 2 (step S503).

Then, the control section 100 discriminates whether or not the connection process of a telephone circuit results in success (step S504). If it is discriminated in step S504 that a telephone circuit is connected successfully, then the control section 100 transmits an electronic mail transmitted by radio from the display apparatus 2 to the mail box of the object party through the connected telephone circuit, ISP and the Internet (step S505).

After the process in step S505 is completed, the control section 100 returns its processing to step S501 to repeat the processing beginning with step S501 and thus waits for reception of a request from the display apparatus 2 in step S501. On the other hand, if it is discriminated in step S504 that a telephone circuit is not connected successfully, then since communication through a telephone circuit is impossible, the control section 100 returns its processing to step S501 to repeat the processing beginning with step S501 and thus waits for reception of a request from the display apparatus 2.

Further, if it is discriminated in step S502 that the request received from the display apparatus 2 is not an electronic mail transmission request, then the control section 100 discriminates whether or not the received request from the display apparatus 2 is a request for provision of an electronic mail destined for the user (downloading request) (step S506).

If it is discriminated in step S506 that the received request from the display apparatus 2 is an electronic mail provision request, then the control section 100 executes a connection process to connect a telephone circuit to the object ISP based on the telephone number of an ISP, a personal identification number and so forth included in the provision request and transmit a notification of a result of the connection to the display apparatus 2 (step S507)

Then, the control section 100 discriminates whether or not a telephone circuit is connected successfully to the object ISP (step S508) If it is discriminated in step S508 that a telephone circuit is connected successfully, then the control section 100 of the channel selection apparatus 1 soon receives an electronic mail transmitted from the ISP through the telephone line L and the modem section 110, forms transmission information from the received electronic mail and transmits the transmission information by radio to the display apparatus 2 through the switch circuit 14, demodulation section 15, transmission signal formation section 16, transmission processing section 17S, multicoupler 17K and transmission/reception antenna 18.

In the process in step S509, the switch circuit 14 is changed over to the input terminal b side in response to a changeover control signal from the control section 100. Consequently, the display apparatus 2 can receive an electronic mail destined for the user and acquired by the control section 100 of the channel selection apparatus 1 and display the received electronic mail on the display screen of the LCD apparatus 25 so that it may be provided to the user.

After the process in step S509 is completed, the control section 100 returns its processing to step S501 to repeat the processing beginning with step S501 and thus waits for reception of a request from the display apparatus 2 in step S501. On the other hand, if it is discriminated in step S508 that a telephone circuit is not connected successfully, then since communication through a telephone circuit is impossible, the control section 100 returns its processing to step S501 to repeat the processing beginning with step S501 and thus waits for reception of a request from the display apparatus 2.

If it is discriminated in step S506 that the received request from the display apparatus 2 is not an electronic mail provision request, then the control section 100 discriminates whether or not the request from the display apparatus 2 is a disconnection request of the connected telephone circuit (S510). If it is discriminated in step S510 that the request from the display apparatus 2 is a disconnection request of the telephone circuit, then the control section 100 performs a process to disconnect the telephone circuit connected to the ISP (step S511). Thereafter, the processing returns to step S501 to repeat the processing beginning with step S501.

If it is discriminated in step S510 that the request from the display apparatus 2 is not a disconnection request of the telephone circuit, then the control section 100 performs a process in accordance with the request such as, for example, a process of changing the selected channel (step S512). Thereafter, the processing returns to step S501 to repeat the processing beginning with step S501.

In this manner, the channel selection apparatus 1 can receive a request transmitted by radio from the display apparatus 2, and transmit an electronic mail, download an electronic mail destined for the user or change the selected channel of a television broadcasting signal in accordance with the received request.

While the foregoing description relates to transmission or reception of an electronic mail, also to establish a connection to the Internet to acquire information provided on the Internet or transmit information to the Internet can be performed in a similar manner as in transmission or reception of an electronic mail.

In this manner, where the channel selection apparatus 1 and the display apparatus 2 which can communicate with each other by radio as in the present embodiment are used, it is possible within an area within which the channel selection apparatus 1 and the display apparatus 2 can communicate with each other favorably to enjoy an intended television broadcasting program on the display apparatus 2, transmit an electronic mail, download and read an electronic mail destined for the user or acquire necessary information through the Internet at any place.

The channel selection apparatus 1 may be placed at any place only if it can be connected to the antenna cable 11cb and the telephone line L led in the house. Further, the display apparatus 2 can be used at any place only if it is within a range within which it can communicate by radio with the channel selection apparatus 1. In other words, once the channel selection apparatus 1 is located, the display apparatus 2 can be carried to and placed and used at any place favorable to the user such as in a room of the user or in a garden.

Accordingly, enjoyment of a television program, transmission/reception of an electronic mail or utilization of the Internet can be performed at any place favorable to the user without being determined fixedly such as a place at which a television receiver connected to an antenna cable is located or another place at which a personal computer connected to a telephone line is located.

It is to be noted that, while preparation of an electronic mail, transmission of a prepared electronic mail and reception of an electronic mail destined for the user are described, also it is possible to modify and transmit an electronic mail stored in the EEPROM 204 or to delete an electronic mail stored in the EEPROM 204.

Second Embodiment

The first embodiment described above relates to a case wherein a single channel selection apparatus and a single display apparatus are involved. However, it may be desired to use a plurality of display apparatus where a large family is involved or in a like case. However, if a plurality of channel selection apparatus are used corresponding to such display apparatus, then a plurality of connection terminals between an antenna cable and/or a telephone line led in from the outside to the inside of the house must be provided on a wall of a room or the like. Therefore, in the present second embodiment, a single channel selection apparatus is used commonly for a plurality of display apparatus.

Figure 15:
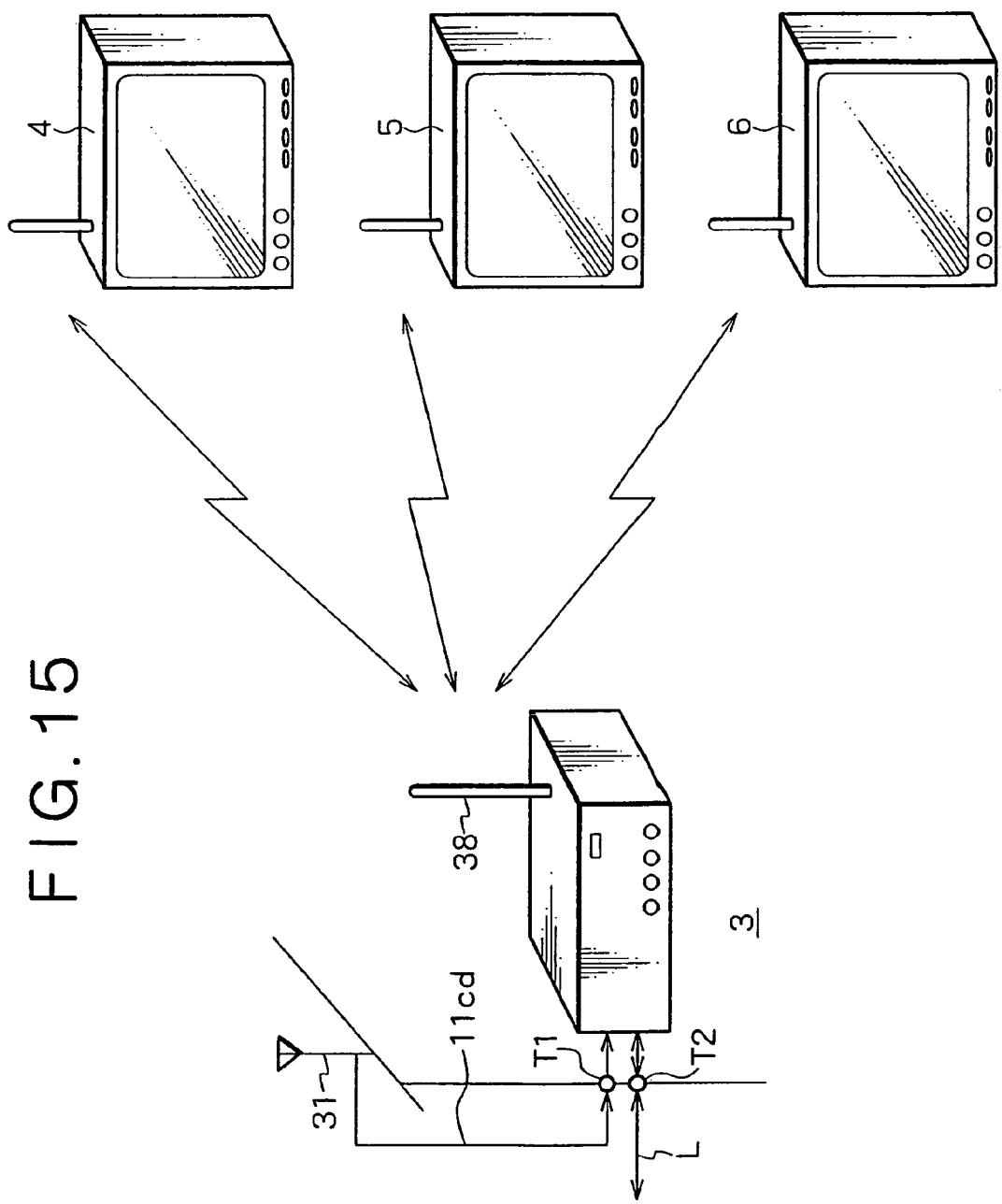
FIG. 15 is a schematic view showing a television reception system according to a second embodiment of the present invention.

FIG. 15 shows an outline of a television reception system of the second embodiment. Referring to FIG. 15, the television reception system shown includes a channel selection apparatus 3, and three display apparatus 4, 5 and 6. The channel selection apparatus 3 and the display apparatus 4, 5 and 6 are individually connected by radio to each other in a similar manner as in the first embodiment described hereinabove.

The channel selection apparatus 3 is located and used at a position at which it can be connected to both of a connection terminal of an antenna cable and a connection terminal of a telephone line led in from the outside to the inside of the house similarly to the channel selection apparatus 1 of the first embodiment described hereinabove. The channel selection apparatus 3 in the second embodiment includes a plurality of channel selection sections and a plurality of demodulation sections so that it can transmit transmission signals of different contents individually to the display apparatus 4, 5 and 6 and can receive radio signals individually from the display apparatus 4, 5 and 6 and perform processing corresponding to the received radio signals as hereinafter described in detail.

Meanwhile, the display apparatus 4, 5 and 6 are configured substantially similarly to the display apparatus 2 of the first embodiment described hereinabove and each can receive only a transmission signal from the channel selection apparatus 3 destined for the display apparatus itself under the control of the control section thereof.

[Channel Selection Apparatus 3]

Figure 16:
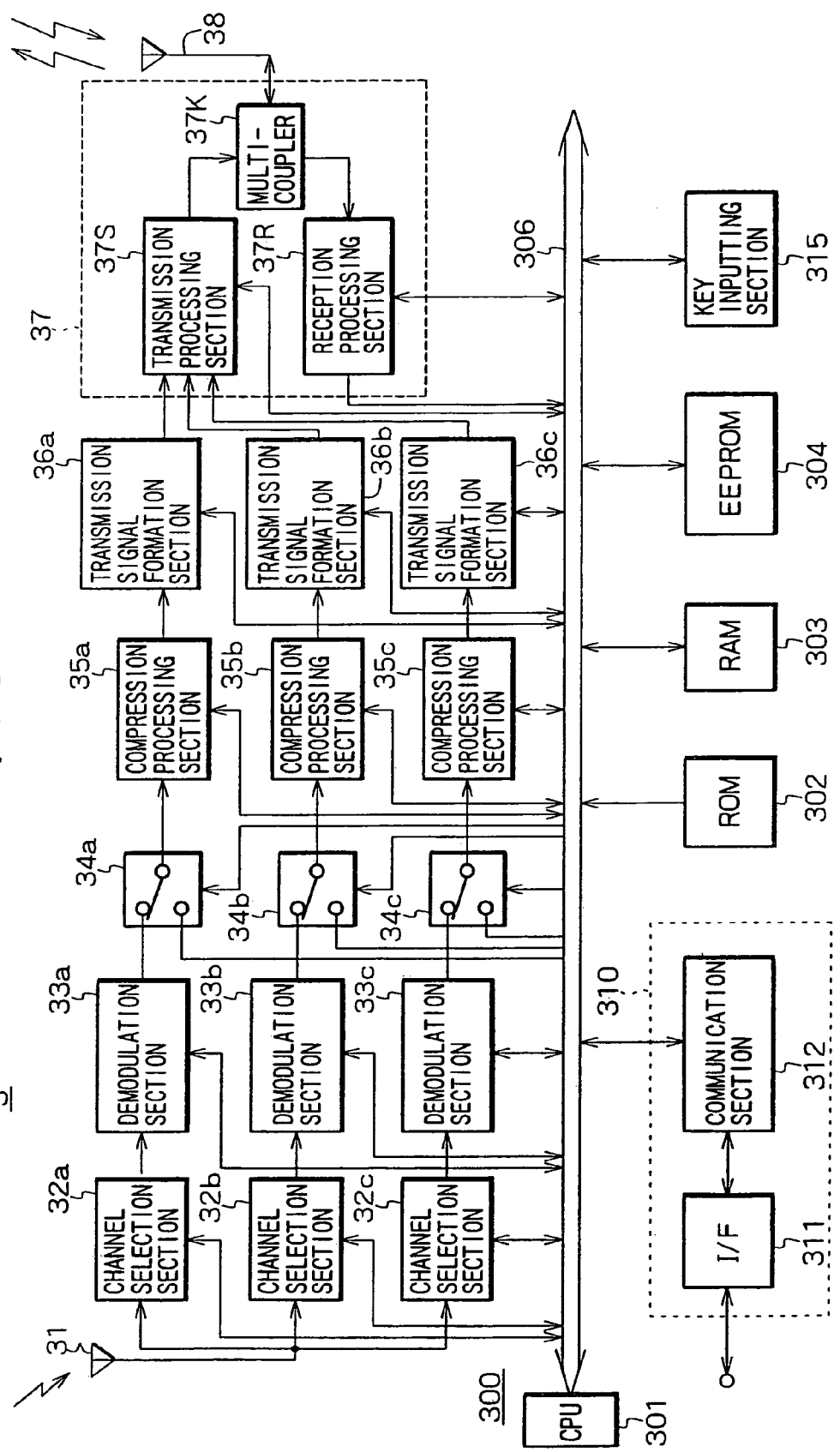
FIG. 16 is a block diagram showing a channel selection apparatus according to the second embodiment of the present invention.

FIG. 16 shows an example of the channel selection apparatus 3 of the second embodiment. The channel selection apparatus 3 shown in FIG. 16 includes a plurality of systems (in the arrangement shown in FIG. 16, three systems) of channel selection sections, demodulation sections, switch circuits, compression processing sections and transmission signal formation sections.

In particular, the channel selection apparatus 3 of the second embodiment includes channel selection sections 32a, 32b and 32c, demodulation sections 33a, 33b and 33c, switch circuits 34a, 34b and 34c, compression processing sections 35a, 35b and 35c, and transmission signal formation sections 36a, 36b and 36c individually having configurations similar to those of the channel selection section 12, demodulation section 13, switch circuit 14, compression processing section 15 and transmission signal formation section 16 of the first embodiment shown in FIG. 2, respectively.

Consequently, the channel selection apparatus 3 can simultaneously select and demodulate three different television broadcasting signals from among television broadcasting signals received by an antenna 31 to form corresponding transmission signals. The transmission signals formed by the transmission signal formation sections 36a, 36b and 36c are supplied to a transmission processing section 37S of a radio section 37.

The radio section 37 of the channel selection apparatus 3 includes the transmission processing section 37S, a reception processing section 37R and a multicoupler 37K similarly to the radio section 17 of the channel selection apparatus 1 of the first embodiment described hereinabove. The transmission processing section 37S of the channel selection apparatus 3, however, can receive transmission signals supplied thereto from the transmission signal formation sections 36a, 36b and 36c and demodulate the received transmission signals into signals of different frequency bands from one another.

In this manner, transmission signals from the transmission signal formation sections 36a, 36b and 36c are modulated into signals of different frequency bands by the transmission processing section 37S and transmitted by radio to the display apparatus 4, 5 and 6 through the multicoupler 37K and a transmission/reception antenna 38.

Further, the radio section 37 of the channel selection apparatus 3 demodulates radio signals from the display apparatus 4, 5 and 6 received through the transmission/reception antenna 38 and the multicoupler 37K and supplies the demodulated signals to a control section 300. In this instance, each of the radio signals from the display apparatus 4, 5 and 6 includes information indicating which one of the display apparatus each of the radio signals originates from, and the control section 300 can discriminate which one of the display apparatus each of the radio signals originates from.

It is to be noted that the multicoupler 37K is provided to prevent otherwise possible interference between a transmission signal and a reception signal similarly to the multicoupler 17K of the channel selection apparatus 1 of the first embodiment and particularly to prevent transmission signals from the transmission processing section 37S from interfering with reception signals received through the transmission/reception antenna 38.

The control section 300 which controls the components of the channel selection apparatus 3 includes, similarly to the control section 100 of the channel selection apparatus 1 of the first embodiment shown in FIG. 2, a CPU 301, a ROM 302, a RAM 303 and an EEPROM 304 connected to a CPU bus 306 so as to cooperatively form a microcomputer. The control section 300 of the channel selection apparatus 3 can control the components independently of each other as seen from FIG. 16.

Also the channel selection apparatus 3 includes, similarly to the channel selection apparatus 1 shown in FIG. 2, a modem section 310 including an interface section 311 and a communication section 312. Thus, the channel selection apparatus 3 can receive various kinds of information through a telephone line L and the modem section 310 and transmit the received information to the display apparatus 4, 5 and 6 through the switch circuits 34a, 34b and 34c, compression processing sections 35a, 35b and 35c, transmission signal formation sections 36a, 36b and 36c, respectively. Further, the channel selection apparatus 3 can transmit information such as an electronic mail from any of the display apparatus 4, 5 and 6 to an object party through the modem section 310 and the telephone line L.

[Display Apparatus 4, 5 and 6]

As described above, each of the display apparatus 4, 5 and 6 which receives transmission signals from the channel selection apparatus 3 which can signal three transmission signals of different frequency bands from one another is configured substantially similarly to the display apparatus 2 of the first embodiment with reference to FIG. 3. However, the display apparatus 4, 5 and 6 use different frequency bands for radio signals to be received and use different frequency bands for radio signals to be transmitted.

The following description proceeds with reference to FIG. 3 on the assumption that the display apparatus 4, 5 and 6 of the second embodiment have such a configuration as described above with reference to FIG. 3.

As described above, however, the display apparatus 4, 5 and 6 use different frequency bands for radio signals which can be received by the reception processing section 22R of the radio section 22. For example, the reception processing section 22R of the display apparatus 4 uses a frequency band of a transmission signal processed through the channel selection section 32a, demodulation section 33a, compression processing section 35a and transmission signal formation section 36a of the channel selection apparatus 3 as a reception frequency band.

Meanwhile, the reception processing section 22R of the display apparatus 5 uses a frequency band of a transmission signal processed through the channel selection section 32b, demodulation section 33b, compression processing section 35b and transmission signal formation section 36b of the channel selection apparatus 3 as a reception frequency band. Similarly, the reception processing section 22R of the display apparatus 6 uses a frequency band of a transmission signal processed through the channel selection section 32c, demodulation section 33c, compression processing section 35c and transmission signal formation section 36c of the channel selection apparatus 3 as a reception frequency band.

Consequently, each of the display apparatus 4, 5 and 6 can receive and demodulate only a transmission signal destined therefor from among transmission signals from the channel selection apparatus 3 so that the demodulated signal can be provided to the user.

The transmission processing section 22S of the radio section 22 of each of the display apparatus 4, 5 and 6 transmits a radio signal of a frequency band different from those of the other display apparatus. This prevents otherwise possible radio interference even if radio signals of instruction information or the like are transmitted to the channel selection apparatus 3 simultaneously.

The reception processing section 37R of the channel selection apparatus 3 can receive and demodulate radio signals of different frequency bands from the display apparatus 4, 5 and 6, respectively, and supply the demodulated data to the control section 300.

The transmission signal formation section 28 of each of the display apparatus 4, 5 and 6 forms a transmission signal to which an identification ID allocated thereto in advance is added. Consequently, since transmission signals transmitted by radio from the display apparatus 4, 5 and 6 include identification IDs by which the transmission signals can be identified, the channel selection apparatus 3 can discriminate which one of the display apparatus 4, 5 and 6 each transmission signal originates from based on the identification ID included in data of the transmission signal supplied from the reception processing section 37R, and execute a process for the discriminated display apparatus.

For example, if a channel selection instruction signal from the display apparatus 4 is received by the channel selection apparatus 3, then the control section 300 of the channel selection apparatus 3 controls the channel selection section 32a. On the other hand, if a channel selection instruction signal from the display apparatus 5 is received by the channel selection apparatus 3, then the control section 300 of the channel selection apparatus 3 controls the channel selection section 32b. Similarly, if a channel selection instruction signal from the display apparatus 6 is received by the channel selection apparatus 3, then the control section 300 of the channel selection apparatus 3 controls the channel selection section 32c.

Further, if an information provision request from the display apparatus 4 obtained through the telephone line L and the modem section 310 is received by the channel selection apparatus 3, then the control section 300 of the channel selection apparatus 3 controls the switch circuit 34a to change over so that a signal on the input terminal b side may be outputted. If an information provision request from the display apparatus 5 obtained through the telephone line L and the modem section 310 is received by the channel selection apparatus 3, then the control section 300 of the channel selection apparatus 3 controls the switch circuit 34b to change over so that a signal on the input terminal b side may be outputted.

Similarly, if an information provision request from the display apparatus 6 obtained through the telephone line L and the modem section 310 is received by the channel selection apparatus 3, then the control section 300 of the channel selection apparatus 3 controls the switch circuit 34c to change over so that a signal on the input terminal b side may be outputted. In this manner, since each of the display apparatus 4, 5 and 6 adds an identification ID of itself to a transmission signal, the channel selection apparatus 3 can perform a process in accordance with each of transmission signals from the display apparatus 4, 5 and 6 appropriately.

It is to be noted that frequency bands to be individually allocated to the display apparatus 4, 5 and 6 are determined in advance between and set individually to the channel selection apparatus 3 and the display apparatus 4, 5 and 6.

In this manner, in the present television reception system, the display apparatus 4, 5 and 6 can commonly use the channel selection apparatus 3. Besides, the display apparatus 4, 5 and 6 can provide broadcasting programs from different television broadcasting signals from one another to the user.

Further, each of the display apparatus 4, 5 and 6 can receive provision of information received through the telephone line L and the modem section 310 and transmit an electronic mail or various kinds of information to an object party through the telephone line L and the modem section 310 similarly to the display apparatus 2 of the first embodiment.

It is to be noted that the transmission processing section 37S in the channel selection apparatus 3 modulates transmission signals from the transmission signal formation sections 36a, 36b and 36c into signals of different frequency bands from one another. Alternatively, however, transmission processing sections corresponding to the transmission signal formation sections 36a, 36b and 36c may be provided so that transmission signals of different frequency bands from one another may be formed. In other words, a plurality of radio sections may be provided.

Third Embodiment

The channel selection apparatus 3 of the second embodiment described above transmits transmission signals from the transmission signal formation sections 36a, 36b and 36c as signals of frequency bands different from one another. However, transmission signals are digital data and may be transmitted alternatively as a time-division multiplexed signal.

Thus, the channel selection apparatus of the third embodiment can select three different television broadcasting signals at a time similarly to the channel selection apparatus 3 of the second embodiment described hereinabove. However, the channel selection apparatus of the present embodiment time-division multiplexes transmission signals formed from three selected television broadcasting signals and transmits the signal obtained by the time-division multiplexing.

Figure 17:
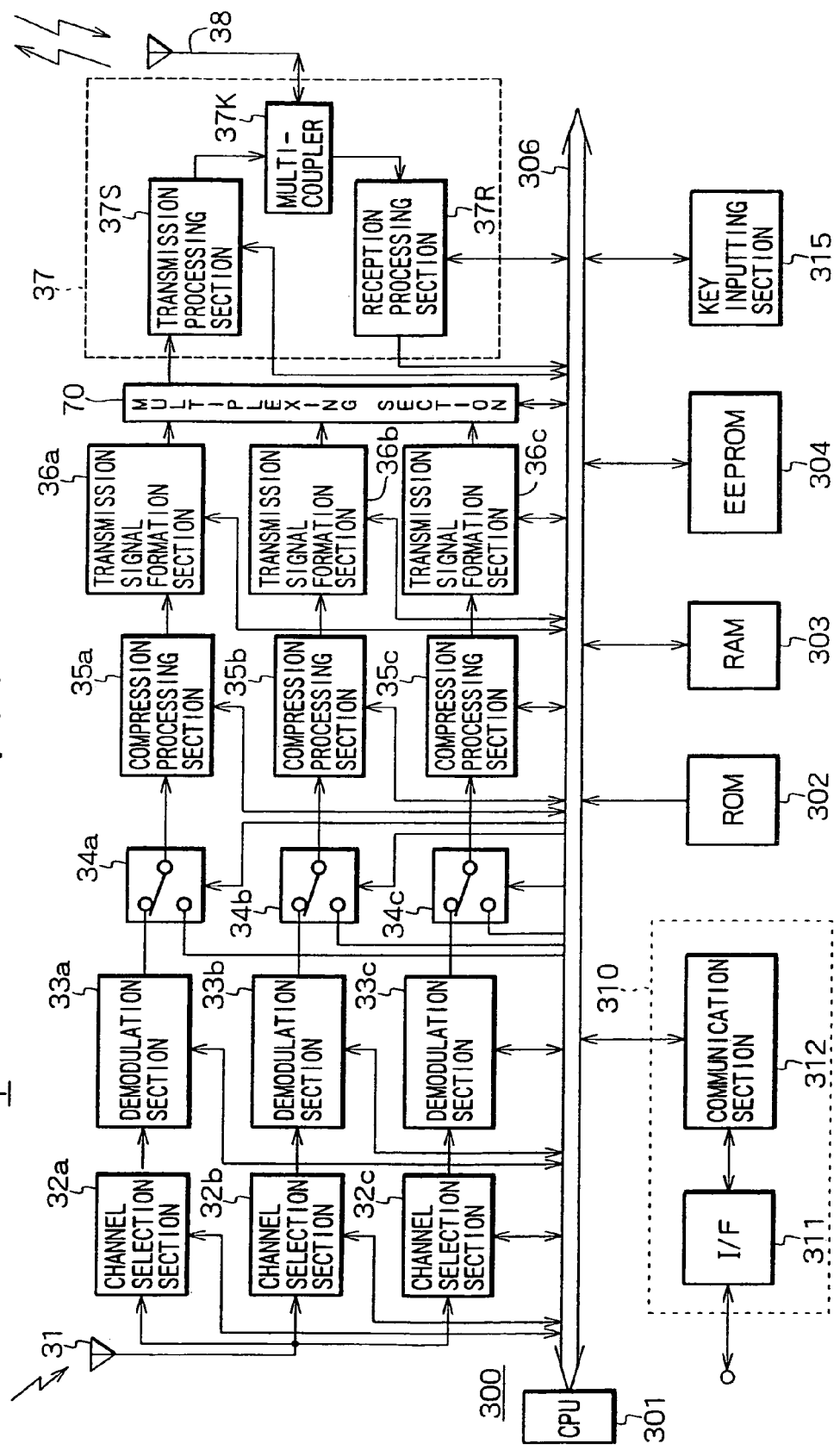
FIG. 17 is a block diagram showing a channel selection apparatus according to the second embodiment of the present invention.

FIG. 17 shows a channel selection apparatus 7 of the third embodiment. Referring to FIG. 17, the channel selection apparatus 7 is similar in configuration to but different from the channel selection apparatus 3 shown in FIG. 16 in that it additionally includes a multiplexing section 70. Therefore, the same reference characters note the portions of the channel selection apparatus 7 which have configurations similar to those of the channel selection apparatus 3 of the second embodiment shown in FIG. 16 and the description thereof is eliminated.

In the channel selection apparatus 7 as shown in FIG. 17, the multiplexing section 70 is provided in the stage next to the transmission signal formation sections 36a, 36b and 36c. Thus, transmission signals formed by the transmission signal formation sections 36a, 36b and 36c are supplied to the multiplexing section 70.

Figure 18:
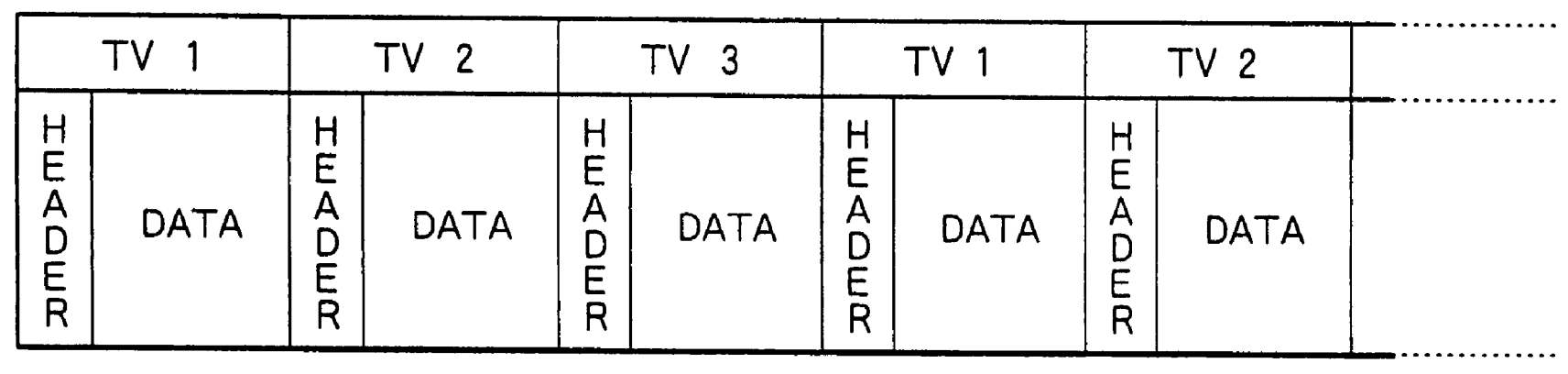

FIG. 18 illustrates a multiplexed transmission signal formed by the multiplexing section 70. Referring to FIG. 18, the multiplexing section 70 forms a multiplexed transmission signal in which transmission signals from the transmission signal formation sections 36a, 36b and 36c are time-division multiplexed like TV1, TV2, TV3, TV1 . . . .

Data in the column of TV1 are a transmission signal from the transmission signal formation section 36a; data in the column of TV2 are a transmission signal from the transmission signal formation section 36b; and data in the column of TV3 are a transmission signal from the transmission signal formation section 36c. In the time-division multiplexed transmission signal illustrated in FIG. 18, a header part is provided at the top of data in each column so as to facilitate a display apparatus of the transmission destination of the data to extract the data for the display apparatus readily.

In this manner, the multiplexing section 70 of the channel selection apparatus 7 time-division multiplexes transmission signals from the transmission signal formation sections 36a, 36b and 36c to form a multiplexed transmission signal and supplies the multiplexed transmission signal to the transmission processing section 37S of the radio section 37. The radio section 37 modulates and amplifies the multiplexed transmission signal supplied thereto from the multiplexing section 70 and transmits the multiplexed transmission signal by radio to the display apparatus through the multicoupler 37K and the transmission/reception antenna 38.

[Display Apparatus 8]

Figure 19:
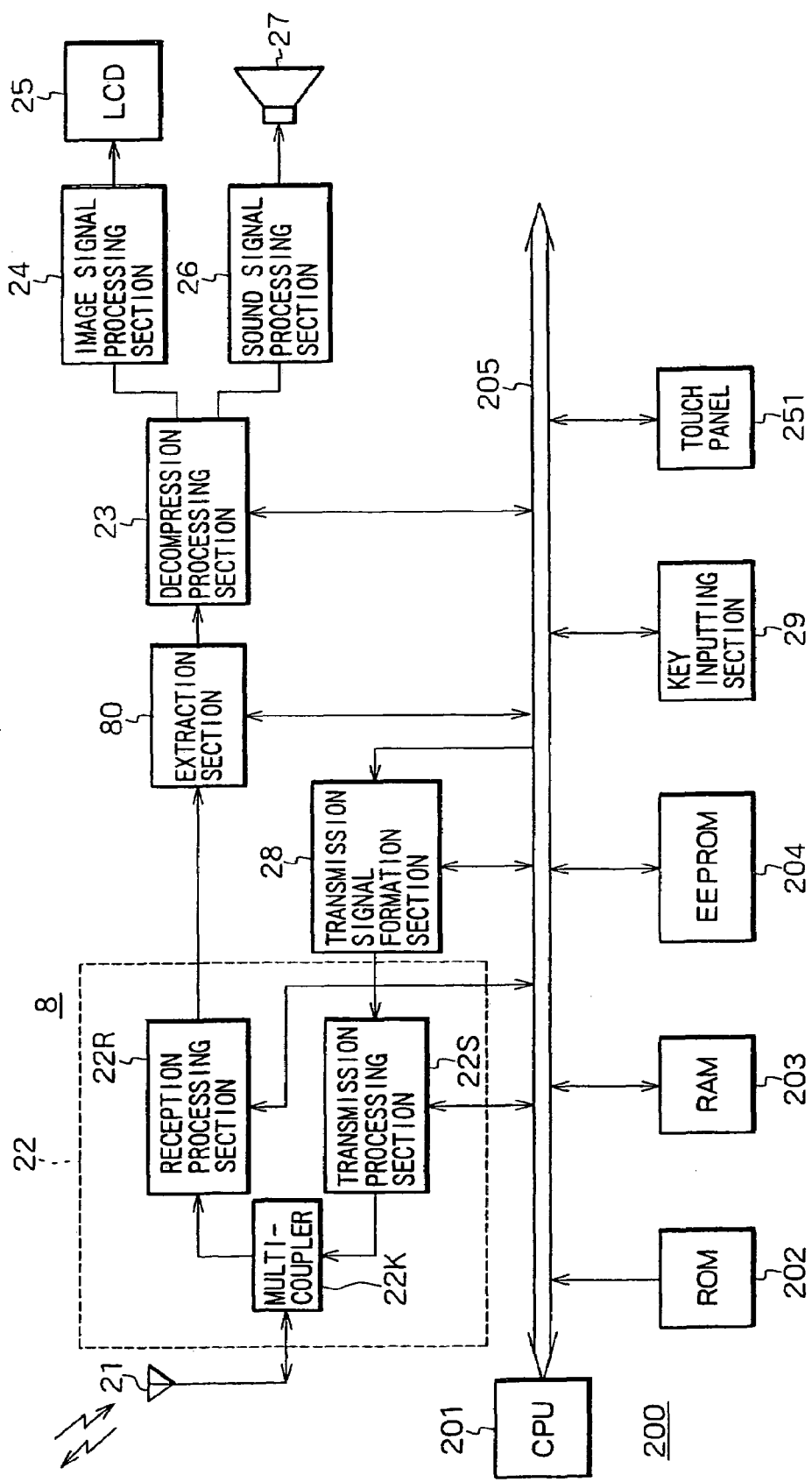
FIG. 19 is a block diagram showing a display apparatus which receives the multiplexed transmission signal transmitted by radio from the channel selection apparatus shown in FIG. 17, according to the second embodiment of the present invention.

FIG. 19 shows an example of configuration of a display apparatus which receives a multiplexed transmission signal from the channel selection apparatus 7 of the third embodiment. Referring to FIG. 19, the display apparatus 8 has a configuration similar to but is different from the display apparatus 2 of the second embodiment with reference to FIG. 3 in that the display apparatus 8 additionally includes an extraction section 80.

Therefore, the same reference characters note the portions of the display apparatus 8 which have configurations similar to those of the display apparatus 2 of the first embodiment shown in FIG. 3 and the description thereof is eliminated. In the display apparatus 8, a multiplexed transmission signal from the channel selection apparatus 7 is received and demodulated by the transmission/reception antenna 21, multicoupler 22K and reception processing section 22R and supplied to the extraction section 80.

The extraction section 80 extracts a transmission signal destined for the display apparatus 8 from within such a multiplexed transmission signal as illustrated in FIG. 18 and supplies the transmission signal to the decompression processing section 23 under the control of the control section 200. Also in the third embodiment, a plurality of such display apparatus 8, particularly in this embodiment, three display apparatus 8, can be used at a time, and each of the display apparatus 8 extracts a transmission signal destined for the display apparatus itself from within such a multiplexed transmission signal as illustrated in FIG. 18.

It is to be noted that transmission signals to be individually allocated to the display apparatus are determined in advance between and set individually to the channel selection apparatus 7 and the individual display apparatus 8, similar to the second embodiment.

In this manner, it is possible for a display apparatus to extract and reproduce, from a time-division multiplexed signal of a plurality of transmission signals provided to the display apparatus, the transmission signal destined for the display apparatus itself so as to provide the transmission signal to the user. It is to be noted that also the channel selection apparatus 7 of the third embodiment can provide not only a broadcasting program based on a television broadcasting signal but also data acquired through the telephone line L and the modem section 310 to the display apparatus 8 or transmit information from the display apparatus 8 to an object party through the telephone line L and the modem section 310.

While the foregoing description of the second and third embodiments is given by way of an example wherein three display apparatus are used in parallel, the number of display apparatus is not limited to three. Where the number of display apparatus is increased to four, five and so forth, also the number of channel selection sections and demodulation sections of the channel selection apparatus should be increased accordingly. Naturally, a channel selection apparatus which is ready for two display apparatus can be configured.

Even where a channel selection apparatus is used commonly for a plurality of display apparatus, it need not necessarily be used always by the plurality of display apparatus. In particular, even if a channel selection apparatus configured for use commonly for a plurality of display apparatus is used by one display apparatus, a television program can be enjoyed or an electronic mail or the Internet can be utilized without any trouble. Accordingly, it is possible to first purchase and use a single channel selection apparatus, which can be used commonly by a plurality of display apparatus, and a single display apparatus and then, when it becomes necessary, purchase another display apparatus newly.

It is to be noted that operation of the first, second and third embodiments is described hereinabove by way of an example wherein a broadcasting program provided by a television broadcasting signal is enjoyed and another example, wherein an electronic mail is transmitted and received through the Internet. In addition, however, also it is possible to acquire various data through the Internet and provide the data to the user through a display apparatus or transmit information from a display apparatus to the Internet.

Also it is possible to transmit data directly to a facsimile terminal, a personal computer or a like apparatus of an object party or receive data directly from a facsimile terminal, a personal computer or a like apparatus through a display apparatus and a channel selection apparatus.

Each television broadcasting signal to be received may be an analog television broadcasting signal or a digital television broadcasting signal. Where a digital broadcasting signal is received, since one digital broadcasting signal includes a plurality of signals of different broadcasting programs in a time-division multiplexed form, a demultiplexer should be provided in the next stage to the demodulation section such that, in addition to selection of a digital television broadcasting signal, also selection of a broadcasting program can be performed in response to an instruction of a radio signal from the display apparatus.

Also it is possible to design a channel selection apparatus which can receive only one digital broadcasting signal and provide a plurality of signals of different broadcasting programs included in the digital broadcasting signal to different display apparatus. In this instance, the channel selection apparatus can be configured from one channel selection and one demodulation section but from a number of demultiplexers equal to the number of display apparatus.

In the embodiments described above, the touch panel is adhered to the display screen of the display apparatus so that inputs of various information can be performed through the touch panel, but the present invention is not limited thereto. For example, it is possible to design a display apparatus which can be connected to a key board apparatus by way of wire or optical communications using infrared rays, or the like, so that inputs of various information such as preparation of an electronic mail can be performed through the key board apparatus.

Also it is possible to design a display apparatus to transmit only a signal relating to a channel selection apparatus by radio. Alternatively, a display apparatus may be configured such that it transmits information of all instruction inputs from the user without discriminating the instruction inputs between those which relate to the channel selection apparatus and those which relate to the display apparatus. In this instance, the channel selection apparatus may accept only information relating to the channel selection apparatus from among radio signals from the display apparatus.

Where the channel selection apparatus accepts only information relating to the channel selection apparatus from among radio signals from the display apparatus in this manner, the display apparatus can be used as a remote control apparatus for electronic equipment other than the channel selection apparatus.

It is to be noted that, while, in the first, second and third embodiments, a telephone line is connected to a channel selection apparatus, a telephone line need not necessarily be connected. Instead, for example, for a cable television broadcasting, an optical cable can be used to provide a broadcasting program and access a communication network such as the Internet therethrough. The present invention can be applied also where an optical cable for cable broadcasting is used to receive provision of a signal of a broadcasting program and connect a communication circuit to effect communication processing therethrough.

Further, while, in the third embodiment described above, the channel selection apparatus 7 forms such a multiplexed transmission signal as illustrated in FIG. 18, the multiplexed transmission signal is not limited to that illustrated in FIG. 18 but may be any of multiplexed transmission signals of various formats.

Where the channel selection apparatus receives a digital television broadcasting signal or a signal of compressed data, it may transmit the compressed signal as it is without compressing the data of it again.

Further, while each display apparatus in the embodiments described above uses an LCD apparatus as a display element thereof, any other display element such as a cathode ray tube or a plasma display unit may be used.

Further, the processes for preparation, transmission and reception of an electronic mail are not limited to those of the embodiments described above, and such processes and other necessary processes may be performed in various manners using software.

While preferred embodiments of the present invention have been described using specific terms, such description is for illustrative purposes only, and it is to be understood that changes and variations may be made without departing from the spirit or scope of the following claims.

What is claimed is:

1. A channel selection apparatus capable of receiving television signals, selecting a television signal from the received television signals and transmitting the selected television signal to a physically spaced and separated remote display apparatus, comprising:
    a reception unit in communication via a network with the remote display and configured to receive a channel selection instruction from the remote display apparatus;
    a channel selection unit configured to select a particular television signal from among supplied television signals in response to the channel selection instruction;
    a transmission unit configured to transmit the particular television signal to the remote display apparatus through the network; and
    a non-volatile memory configured to store information of the particular television signal selected before main power to the channel selection apparatus is interrupted, and to cause said channel selection unit to automatically select a supplied television signal corresponding to the stored information when said main power subsequently is restored.

2. The channel selection apparatus according to claim 1, further comprising
    a compression processing unit configured to compress the particular television signal in accordance with a predetermined compression technique for transmission through said network to said remote display apparatus.

3. The channel selection apparatus according to claim 2, wherein said predetermined compression technique comprises MPEG (Motion Picture Expert Group) processing.

4. The channel selection apparatus according to claim 1, wherein said transmission unit modulates the particular television signal and transmits the modulated television signal to the remote display apparatus; and wherein said network is a wireless communication channel.

5. A channel selection method capable of receiving television signals, selecting a television signal from the received television signals and transmitting the selected television signal over a network to a remote display apparatus, comprising the steps of:
    receiving a channel selection instruction over said network from said remote display apparatus;
    selecting a particular television signal from among the received television signals in response to the channel selection instruction;
    storing information of the particular television signal in a non-volatile memory;
    transmitting the particular television signal to the remote display apparatus through the network; and
    automatically re-selecting a received television signal corresponding to the information stored in said non-volatile memory immediately prior to an interruption in main power at the time said main power is restored.

6. A computer-readable recording medium on which is stored computer-readable instructions to control a processor to carry out the method by which a television signal is selected from received television signals and transmitted over a network to a remote display apparatus, said method implemented by said instructions comprising the steps of:
    receiving a channel selection instruction over said network from said remote display apparatus;
    selecting a particular television signal from among the received television signals in response to the channel selection instruction;
    storing information of the particular television signal in a non-volatile memory;
    transmitting the particular television signal to the remote display apparatus through the network; and
    automatically re-selecting a received television signal corresponding to the information stored in said non-volatile memory immediately prior to an interruption in main power at the time said main power is restored.

* * * * *

UNITED STATES PATENT AND TRADEMARK OFFICE
CERTIFICATE OF CORRECTION

PATENT NO. : 7,610,600 B2
APPLICATION NO. : 11/516830
DATED : October 27, 2009
INVENTOR(S) : Maeda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Twelfth Day of October, 2010

David J. Kappos
*Director of the United States Patent and Trademark Office*